US008029657B1

(12) United States Patent
Wu

(10) Patent No.: US 8,029,657 B1
(45) Date of Patent: Oct. 4, 2011

(54) PARALLEL PLATE ELECTRODES FOR PARTICLE CONCENTRATION OR REMOVAL

(75) Inventor: Jie Wu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 523 days.

(21) Appl. No.: 11/684,819

(22) Filed: Mar. 12, 2007

Related U.S. Application Data

(60) Provisional application No. 60/782,034, filed on Mar. 14, 2006.

(51) Int. Cl.
*G01N 27/447* (2006.01)
*G01N 27/453* (2006.01)

(52) U.S. Cl. ........ 204/547; 204/643; 422/500; 422/503; 435/283.1

(58) Field of Classification Search .................. 204/547, 204/600–643; 435/30, 283.1; 422/500, 503
See application file for complete search history.

(56) References Cited

U.S. PATENT DOCUMENTS 4,994,166 A * 2/1991 Fernwood et al. ............ 204/614
6,660,493 B2 * 12/2003 Miles .............................. 435/30
7,156,970 B2 * 1/2007 Lean et al. ..................... 204/547
2001/0047941 A1 * 12/2001 Washizu et al. ............... 204/547
2003/0057094 A1 * 3/2003 Bryning et al. ............... 204/547
2004/0077074 A1 * 4/2004 Ackley et al. .............. 435/287.2
2006/0243594 A1 * 11/2006 Schnelle et al. .............. 204/547

FOREIGN PATENT DOCUMENTS

WO WO 2004/013614 * 2/2004

OTHER PUBLICATIONS

Wu et al. ("Wu et al. B"), Micro-Electrical Impedance Spectroscopy for Particle Detection, ICMM Jun. 2004, 865-868.*
Agilent 4294A Precision Impedance Analyzer Data Sheet pre 2005.*
Wu et al. ("Wu et al. A")(High Sensitivity Particle Detection By Biased AC Electroosmotic Trapping on Cantilever, MEMS Jan. 2006, 567-569).*
BK Precision Waveform Generator Guidebook, 2010.*
Ketan H. Bhatt, Sonia Grego, and Orlin D. Velev, An AC Electrokinetic Technique for Collection and Concentration of Particles and Cells on Patterned Electrodes, Apr. 26, 2005 American Chemical Society, Published on Web Jun. 3, 2005 (pp. 6603-6612).

* cited by examiner

*Primary Examiner* — Jeffrey T Barton
*Assistant Examiner* — Jennifer Dieterle
(74) *Attorney, Agent, or Firm* — Ludeka, Neely & Graham, P.C.

(57) ABSTRACT

An AC electro-hydro-dynamic system for aggregating particles immersed in a fluid. The AC electro-hydro-dynamic system utilizes at least one set of parallel plate electrodes each having at least one conductive surface. The conductive surfaces may incorporate island conductive pads or strip conductive pads. The parallel plates may form a first set and a second set. A signal generator provides a time-varying signal across the first set of parallel plate electrodes and the second set of parallel plate electrodes.

23 Claims, 18 Drawing Sheets

A-1 A-2 A-3 A-4 t≈ 0 t ≈ 2 minutes t ≈ 5 minutes

PARALLEL PLATE ELECTRODES FOR PARTICLE CONCENTRATION OR REMOVAL

CROSS REFERENCES TO RELATED APPLICATIONS

This patent application claims priority from and is related to U.S. Provisional Patent Application Ser. No. 60/782,034 filed Mar. 14, 2006, entitled: "Parallel Plate Electrodes for Particle Concentration or Removal." This U.S. Provisional Patent Application is incorporated by reference in its entirety herein.

FIELD

This invention relates to the field of electro-hydro-dynamic motion of fluids and entrained particles. More particularly, this invention relates to AC electro-hydro-dynamic microfluidic flow systems for the concentration and aggregation of particles for detection, collection or removal.

BACKGROUND

AC electro-hydro-dynamic (ACEHD) refers to the microfluidic flows induced in the vicinity of electrodes when an alternating current (AC) signal is applied. The term "AC signal" refers to a voltage that either alternates in polarity or varies periodically in amplitude. The AC signal induces periodically varying and non-uniform charges in the bulk fluid near the electrode (a.k.a. AC electrothermal effect) and/or in the electrochemical double layer (also known as double layer polarization) at the electrode surface (a.k.a. AC electroosmosis or ACEO). The varying and non-uniform charges produce migration of ions, and hence fluidic motion. ACEHD devices may be applied as particle traps, microfluidic pumps, mixers, and so forth.

ACEO devices, as a subset of ACEHD devices, are limited to fluids with conductivities lower than 80 mS/m. ACEHD devices can handle fluids with conductivities range from 1 μS/m to 2 S/m.

Many ACEO devices adopt planar interdigitated electrodes. Interdigitated electrodes are electrodes that are formed as two sets of opposing generally planar comb-like structures that have their "teeth" interlaced but not touching. When AC signals of opposite phase are applied across the two sets of such electrodes that are in contact with a fluid, electric fields are produced in the fluid in the region above and between adjoining teeth. These electric fields have components that are both normal and tangential to the electrodes. The tangential component of the field induces electro-osmotic fluid motion. Also, when an electric field is applied over a fluid body, energy is dissipated within by $\langle P\rangle=\sigma E_{rms}^2$ (σ: the electrolyte conductivity), leading to temperature rise. Non-uniform temperature rise, i.e. temperature gradient $\nabla T$, produces gradients in conductivity and/or permittivity as $\nabla\epsilon=(\partial\epsilon/\partial T)\nabla T$, $\nabla\sigma=(\partial\sigma/\partial T)\nabla T$, and further, $\nabla\sigma$ and $\nabla\epsilon$ will generate mobile space charges, ρ, in the fluid bulk in AC fields. The space charges migrate under the influence of electric field and induce flow. Planar interdigitated electrodes have an effective range on the order of hundreds micrometers from the electrode surface.

AC electro-osmotic systems with interdigitated electrodes have generally short effective range of trapping bacteria and other particles. Also they are not effective for fluids with conductivity higher than 20 mS/m. So they have been used mainly to assist detection rather than collection, separation and remediation. Dielectrophoretic systems typically only collect contaminants having a minimum particle size greater than a few microns. What is needed therefore is a system for collecting large quantities of entrained particles with fewer limitations regarding minimum particle size, and fluid conductivity, thereby, for example, permitting effective collection of nanosize particles.

SUMMARY

The present invention provides a first apparatus for aggregating particles immersed in a fluid. The first apparatus has an electrode that has a conductive surface and a first plate electrode that is disposed proximal to the electrode. The first plate electrode has at least one conductive pad facing the conductive surface of the electrode at a separation distance from the conductive surface of the electrode. There is a spatial volume between the electrode and the first plate electrode in which the fluid with the immersed particles is disposed. The first apparatus also has a signal generator that is coupled to the electrode and the first plate electrode. The signal generator is configured to provide a time-varying signal across the conductive surface and the at least one conductive pad. In preferred embodiments the separation distance is between approximately ten microns and three millimeters. In some embodiments of the first apparatus the electrode includes a wire. In some embodiments of the first apparatus, the at least one conductive pad is an island pad, and in some embodiments the at least one conductive pad is a needle, and in some embodiments the at least one conductive pad is a strip pad.

In a first special variation of the first apparatus, the first plate electrode has a plurality of conductive pads facing the conductive surface of the electrode. In some embodiments of the first special variation of the first apparatus, the conductive pads comprise island pads, each having a maximum surface dimension between approximately ten microns and three millimeters. In some embodiments of the first special variation of the first apparatus, the conductive pads include island pads and the island pads are spaced apart at a distance between approximately ten microns and three millimeters. In some embodiments of the first special variation of the first apparatus, the conductive pads comprise strip pads each having a maximum width of between approximately fifty microns and three millimeters, and in some embodiments of the first special variation of the first apparatus the conductive pads include strip pads and the strip pads are spaced apart at a distance of between approximately ten microns and three millimeters.

In some embodiments of the first apparatus, the electrode is a second plate electrode and the conductive surface of the second plate electrode includes a plurality of second conductive pads and the at least one conductive pad of the first plate electrode comprises a plurality of first conductive pads laterally offset from the second conductive pads of the second plate electrode. In some embodiments of the first apparatus, the time-varying signal has a peak-to-peak voltage between approximately one half volt to one hundred volts and the time-varying signal varies at a frequency between approximately ten Hz to ten MHz.

A second apparatus for aggregating particles immersed in a fluid is also provided. The second apparatus includes a first set of plate electrodes comprising at least one first plate electrode having a first conductive surface and an opposing second conductive surface having a first conductive pattern. The second apparatus also has a second set of plate electrodes that includes at least one second plate electrode having a first conductive surface and an opposing second conductive surface having a second conductive pattern. In this second apparatus, the first and second plate electrodes are interleaved with each other and are separated by separation distances establishing spaces between adjacent plate electrodes in which the fluid with the immersed particles is disposed. Furthermore, the first conductive surface of each first plate electrode that is disposed between two adjacent second plate electrodes faces the second conductive surface of one of the second plate electrodes, and the first conductive surface of each second plate electrode that is disposed between two adjacent first plate electrodes faces the second conductive surface of one of the first plate electrodes. The second apparatus also includes a signal generator that is configured to provide a time-varying signal across the first and second sets of plate electrodes.

In some embodiments of the second apparatus each separation distance is between approximately ten microns and three millimeters. In some embodiments of the second apparatus the conductive pattern includes island pads, and in some embodiments that include island pads the island pads each have a maximum surface dimension between approximately ten microns and three millimeters, and some embodiments include island pads that and sometimes the island pads have a maximum surface dimension between approximately ten microns and three millimeters and are spaced apart at a distance between approximately ten microns and three millimeters. In some embodiments of the second apparatus the conductive pattern includes strip pads. In some of the embodiments of the second apparatus that include strip pads the strip pads each have a maximum width of between approximately fifty microns and three millimeters, and in some of the embodiments of the second apparatus that include strip pads the strip pads are spaced apart at a distance of between approximately ten microns and three millimeters. In some of the embodiments of the second apparatus the first conductive surface of each first plate electrode has a first conductive pattern and the first conductive surface of each second plate electrode has a second conductive pattern.

A third apparatus for aggregating particles immersed in a fluid is also provided. The third apparatus includes a first set of plate electrodes having a first complementary pattern of conductive pads, and a second set of plate electrodes having a second complementary pattern of conductive pads. The first and second set of plate electrodes are interleaved substantially with each other and are separated by separation distances establishing spaces between adjacent plate electrodes in which the fluid with the immersed particles is disposed and the conductive pads of the first complementary pattern are laterally offset from the conductive pads of the second complementary pattern. The third apparatus also includes a signal generator that is configured to provide a time-varying signal across the first and second sets of plate electrodes. In some embodiments of the third apparatus, the first complementary pattern of conductive pads is substantially identical to the second complementary pattern of conductive pads. In some embodiments of the third apparatus, the first and the second complementary pattern of conductive pads comprise island pads, and in some embodiments of the third apparatus, the first and the second complementary pattern of conductive pads comprise strip pads.

BRIEF DESCRIPTION OF THE DRAWINGS

Further advantages may be apparent by reference to the detailed description in conjunction with the figures, wherein elements are not to scale so as to more clearly show the details, wherein like reference numbers indicate like elements throughout the several views, and wherein.

DETAILED DESCRIPTION

Disclosed herein are systems and techniques that may be used to trap particles entrained in aqueous or other fluid environments using alternating current electro-hydro-dynamic (ACEHD) particle trap systems employing various configurations of electrodes. These systems may, for example, be used for separating charged clay particles carrying contaminants from aqueous suspensions of such particles. This application is important because a majority of environmentally contaminated sites contain clay soils. Typical contaminants such as heavy metals (e.g., arsenic, mercury, chromium) or organics (e.g., poly chlorinated biphenyls, polycyclic aromatic hydrocarbons) tend to stay attached to clay particles due to relatively high specific surface of clay soils and/or a negative charge on the clay particles. Nano-size clay particles may remain in suspension for relatively long periods of time making the remediation process very time-consuming using existing technology. The AC electro-hydro-dynamic aggregation systems described herein reduce the particle collection times.

In addition to clay soil remediation, other applications of the AC electro-hydro-dynamic aggregation systems described herein include the rapid concentration (enrichment) of bioparticles for real-time detection and monitoring and remediation of wastewater, groundwater, industrial waste streams etc., by removing undesirable particles from water or other fluids. Other potential applications include separation of ions of trace materials from water, and the aggregation and collection of valuable particulate materials entrained in chemical manufacturing or reclamation process streams.

Figure 1A:
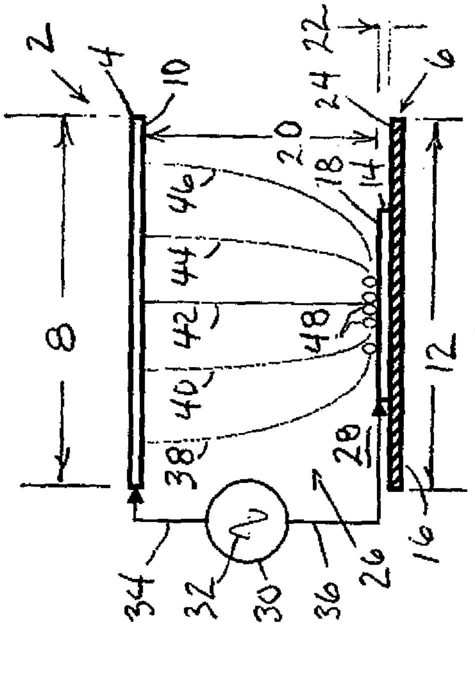
FIG. 1A is a schematic illustration of a front view of non-uniform electrical fields in a parallel plate electro-hydro-dynamic particle aggregation system.

FIG. 1A illustrates a fundamental mechanism of particle trapping using electrodes. Aggregation system 2 includes an electrode 4 and a plate electrode 6. A plate electrode is an electrode having a width, a length and a thickness, where the width dimension and the length dimension are substantially greater than the thickness dimension. In some embodiments a plate electrode may have flat surfaces and in some embodiments a plate electrode may have curved surfaces. Electrode 4 is a substantially uniform electrical conductor and has a length 8 and a first conductive surface 10. Plate electrode 6 has a length 12 and a conductive material 14 that is mounted on an insulative substrate 16. Conductive material 14 has a second conductive surface, conductive pad 18. A "pad" is an area of conductive surface that is delimited at least in part by adjacent insulative material, or an area of insulative surface that is delimited at least in part by adjacent conductive material. In embodiments such as the aggregation apparatus 2 depicted in FIG. 1A, which employ an electrode (e.g., 4) and an opposing single conductive pad (e.g., 18), the spatial area of the conductive pad is typically comparable to (i.e., is a multiple ranging from 0.1× to 10×) the area of the conductive surface (e.g., 10) of the electrode. While FIG. 1A illustrates a plate electrode 6 having a single conductive pad 18, in alternative embodiments a plate electrode may have multiple conductive pads.

Electrode 4 and plate electrode 6 have a separation distance 20. Note that separation distance 20 is measured between conductive surface 10 and the surface of conductive pad 18 that is closest to conductive surface 10. The conductive pad 18 has a thickness 22. The plate electrode 6 has a facing surface 24. A spatial volume 26 defined by electrode 4 and plate electrode 6 and separation distance 20 is filled with fluid 28 that is electrolytic in nature and that contains entrained particles.

Aggregation system 2 also incorporates a signal generator 30. Signal generator 30 produces a time-varying signal 32. Time-varying signal 32 is preferably sinusoidal, as shown. In other embodiments, however, time-varying signal 32 may be a square wave, a triangular wave, a complex waveform, or any time varying signal. Time-varying signal 32 is applied across electrode 4 through first connection 34 and conductive material 14 through second connection 36. Time-varying signal 32 induces voltage changes between first conductive surface 10 and conductive pad 18.

As illustrated in FIG. 1A, because of the difference in the area of first conductive surface 10 and the conductive pad 18, time-varying signal 32 induces non-parallel AC electrical field gradients 36, 40, 42, 44 and 46. Time-varying signal 32 also induces a layer of charges/ions at electrolytes/solids interface between fluid 28 and first conductive surface 10 and between fluid 28 and conductive pad 18. This layer of charges migrates under electric fields tangential to the interface. In AC electro-hydro-dynamic systems, such tangential electric fields are from the same voltage source that induces ions, therefore the changes of polarities in charges and field directions are simultaneous and cancelled out, maintaining steady ion migration. Because of fluid viscosity, the ion movement carries along its surrounding fluid and particles. It is the microfluidic flow that conveys particles from the bulk of the fluid onto the fluid surface. The particles become trapped where there are stagnation points of the fluid motion. In the configuration depicted in FIG. 1A, the flow is substantially stagnate at the conductive pad 18, and consequently particles 48 accumulate proximal to or upon the conductive pad 18.

Figure 1B:
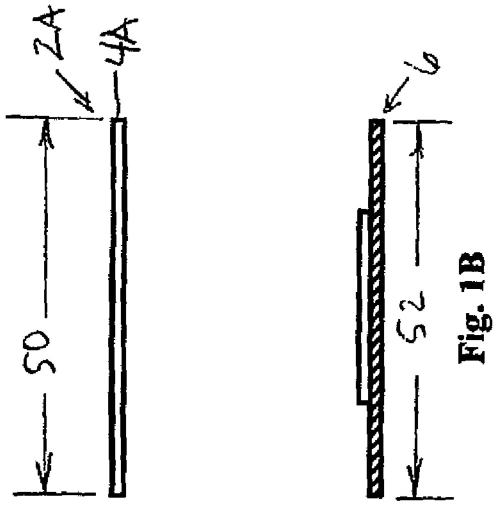
FIG. 1B is a schematic illustration of a side view of a first variation of the particle aggregation system of FIG. 1A.
Figure 1C:
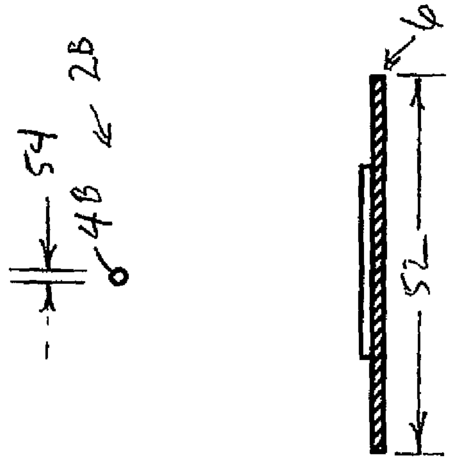
FIG. 1C is a schematic illustration of a side view of a second variation of the particle aggregation system of FIG. 1A.

FIG. 1B illustrates one variation of a side view of the aggregation system 2 of FIG. 1A, designated as aggregation system 2A in FIG. 1B. FIG. 1C illustrates a second variation of a side view of the aggregation system 2 of FIG. 1A, designated as aggregation system 2B in FIG. 1C. Aggregation system 2A of FIG. 1B and aggregation system 2B of FIG. 1C have the same plate electrode 6. Plate electrode 6 has a width 52 (seen in FIGS. 1B and 1C) that is comparable in dimension to the length 12 of the plate electrode 6 (seen n FIG. 1A). The aggregation system 2A of FIG. 1B and the aggregation system 2B of FIG. 1C have different electrodes (i.e., 4A in FIGS. 1B and 4B in FIG. 1C).

FIG. 1B illustrates that electrode 4A in FIG. 1B is a plate electrode and has a width 50 that is similar in dimension to the length 8 illustrated for the electrode 4 in FIG. 1A. In contrast, the electrode 4B in FIG. 1C is a wire electrode, and the wire electrode 4B has a width 54 that is much smaller than the length that 8 that is illustrated for electrode 4 in FIG. 1A. Typically the width 54 of the wire electrode 4B is approximately one hundred microns or larger. As used herein, the term "wire" refers to a conductor having a length (depicted as length 8 in FIG. 1A) that that ranges in value from several multiples to an order of magnitude greater than its width (depicted as width 54 in FIG. 1C). As seen in FIGS. 1A, 1B and 1C, an electrode may consist of a plate electrode or a wire electrode, and in alternate embodiments an electrode may consist of a point source of electrical potential or may consist of a mass of conductive material. In some embodiments a plurality of plate electrodes, wire electrodes, point electrodes or mass electrodes may be employed.

In FIGS. 1A, 1B and 1C the electrodes (4, 4A and 4B) are substantially parallel to the plate electrode 6. In alternate embodiments the electrode may not be parallel to the plate electrode. However the electrode (4, 4A, 4B) should be proximal to the plate electrode 6, meaning that at least a portion of the electrode (4, 4A, 4B) is within the previously described range of separation distance of at least a portion of the plate electrode 6.

Top views of various exemplary embodiments of conductive pads (i.e., 60, 62, 64, 66, and 68) are depicted in FIGS. 2A through 2E. Conductive pads 60, 62, 64, 66 and 68 are shown with aggregated particles 48 on the conductive surfaces of the conductive pads. Conductive pads 60, 62, 64, and 66 are called "island pads" because their latitudinal and longitudinal dimensions are substantially equal in length. That is, the longitudinal dimension 70 and the latitudinal dimension 72 of conductive pad 60 are substantially equal. Similarly, longitudinal dimension 74 and latitudinal dimension 76 of conductive pad 62 are substantially equal, longitudinal dimension 78 and latitudinal dimension 80 of conductive pad 64 are substantially equal, and longitudinal dimension 82 and latitudinal dimension 84 of conductive pad 66 are substantially equal. Conductive pad 68 is an example of a "strip pad," meaning that its latitudinal dimension 86 and its longitudinal dimension 88 are substantially unequal. Preferably longitudinal dimension 88 is at least an order of magnitude greater than the latitudinal dimension 86. While these island conductive pad examples (60, 62, 64, 66 and 68) are illustrated as square, rectangular, or circular in shape, in alternative configurations island conductive pads may have other polygonal, curved, or generally irregular shapes.

Figure 2A:
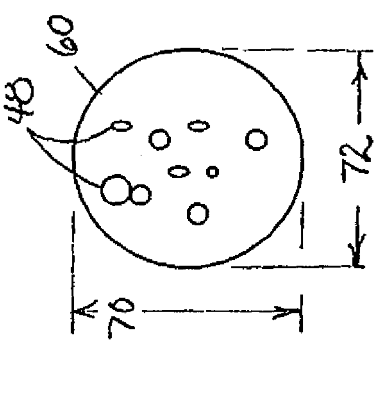
FIGS. 2A-2E illustrate top views of alternative examples of conductive pads for use in an AC electro-hydro-dynamic aggregation system.
Figure 2B:
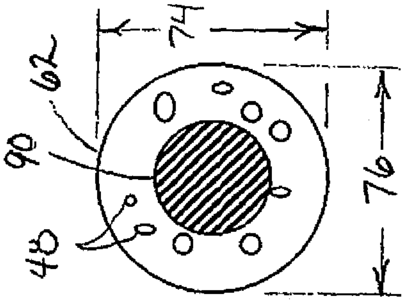
Figure 2C:
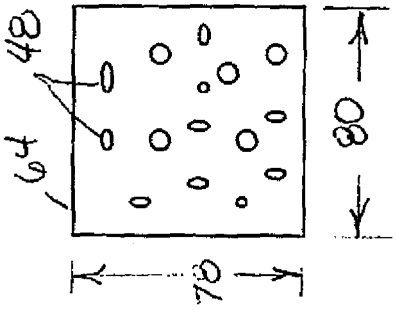
Figure 2D:
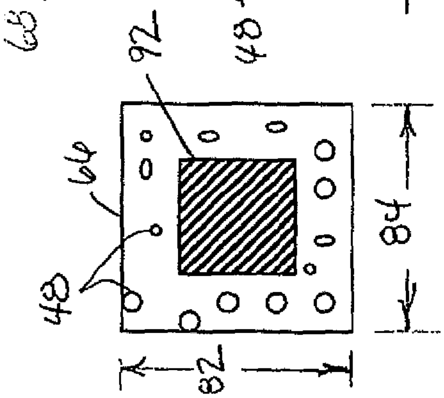
Figure 2E:
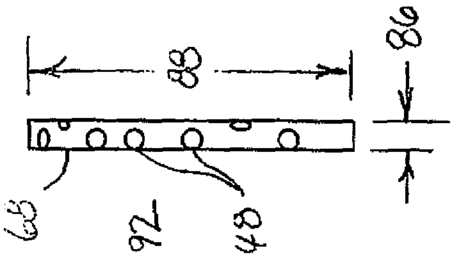

As illustrated in FIGS. 2B and 2D, conductive pads 62 and 66 have interior insulative regions 90 and 92, respectively. When conductive pads 62 and 66 are used in aggregating apparatus 2 of FIG. 1A, the electrical field gradients 36, 40, 42, 44, and 46 will be somewhat different in shape, but will still be non-uniform and will induce stagnation regions on the conductive pad.

Figure 3A:
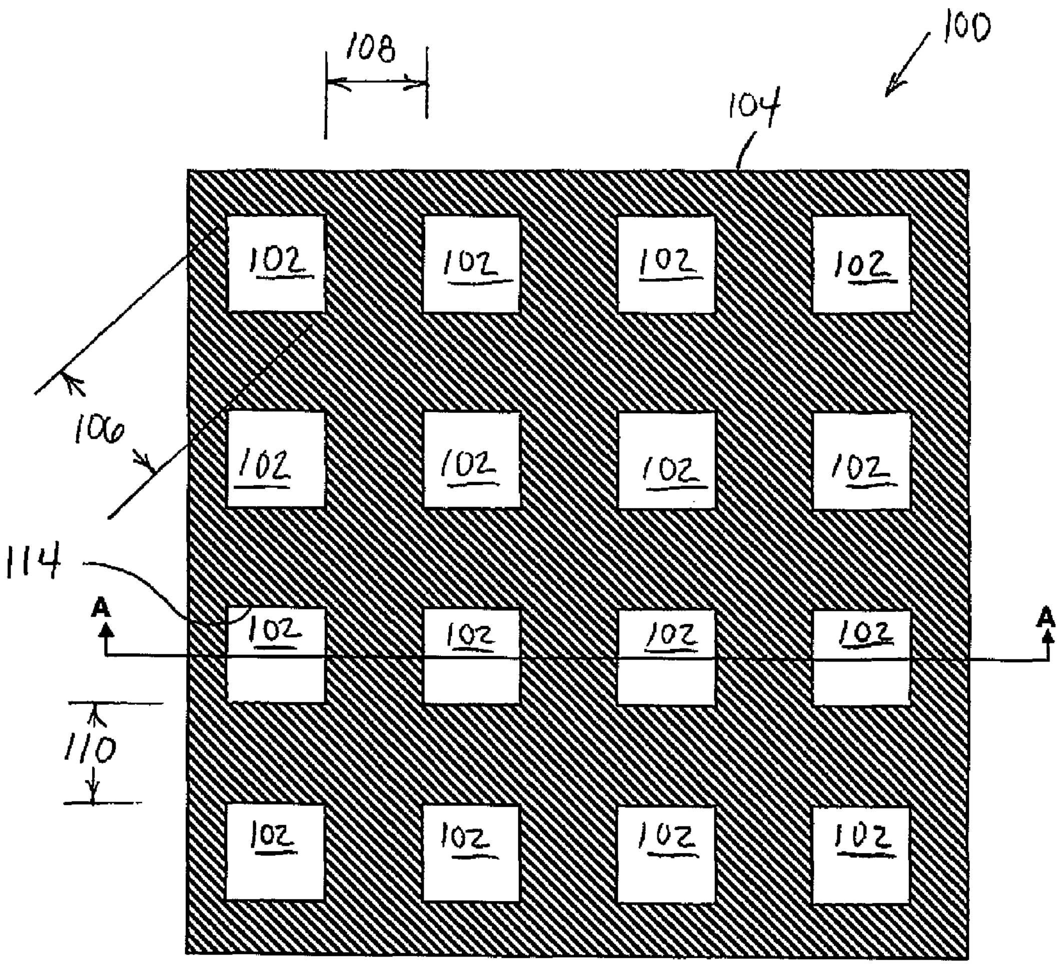
FIG. 3A is a schematic top view of a pattern electrode for an AC electro-hydro-dynamic particle aggregation system.
Figure 3B:
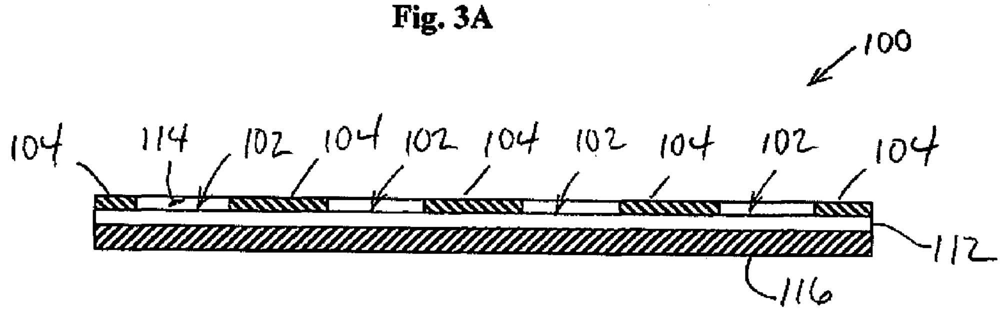
FIG. 3B is a schematic cross-sectional view through Section A-A of the pattern electrode of FIG. 3A.

Aggregation systems may be enhanced by the use of a pattern electrode, or "trapping electrode" to generate non-uniform electric fields at the electrode surface where the tangential electric fields induce electro-hydro-dynamic fluid motion. A pattern electrode is a plate electrode that has a conductive pattern on at least one surface. One embodiment of a pattern electrode 100 is illustrated in FIGS. 3A and 3B. Pattern electrode 100 has a pattern of conductive surfaces, such as conductive pads 102 that are electrically interconnected, but are surrounded by insulative material 104. Each individual conductive pad 102 is an "island pad," which, as previously discussed, indicates that the latitudinal and longitudinal dimensions of the conductive surface are substantially equal. Preferably, island pads (e.g., 102) have a maximum surface dimension 106 between approximately fifty microns and three millimeters, and preferably island pads are spaced apart at distances 108 and 110 that are preferably between approximately one hundred microns and three millimeters.

Further aspects of pattern electrode 100 are seen in FIG. 3B, which illustrates a view taken through section A-A as designated in FIG. 3A. Conductive pads 102 are seen to be areas of a conductor 112 that are exposed by openings in insulator 104. In contrast, recall from FIG. 1A that conductive pad 18 is defined by conductive material 14 that is disposed on insulative substrate 16. The elements 102 in FIGS. 3A and 3B and element 18 in FIG. 1A (and the elements 119 in FIGS. 3C and 3D described later herein) are "conductive pads" because they constitute a conductive surface that is delimited at least in part by adjacent insulative material. Note that surface 114 depicted in FIG. 3B is illustrative of a typical surface of insulative material 104 that is visible from the vantage point of section A-A. This feature is further indicated by the depiction of surface 114 in FIG. 3A. For manufacturability, pattern electrode 100 is preferably formed by coating the surface of conductor 112 with insulative material 104 and then selectively etching away insulative material 104 to expose conductive pads 102. Some embodiments may include a substrate 116 to provide physical support for conductor 112.

Figure 3C:
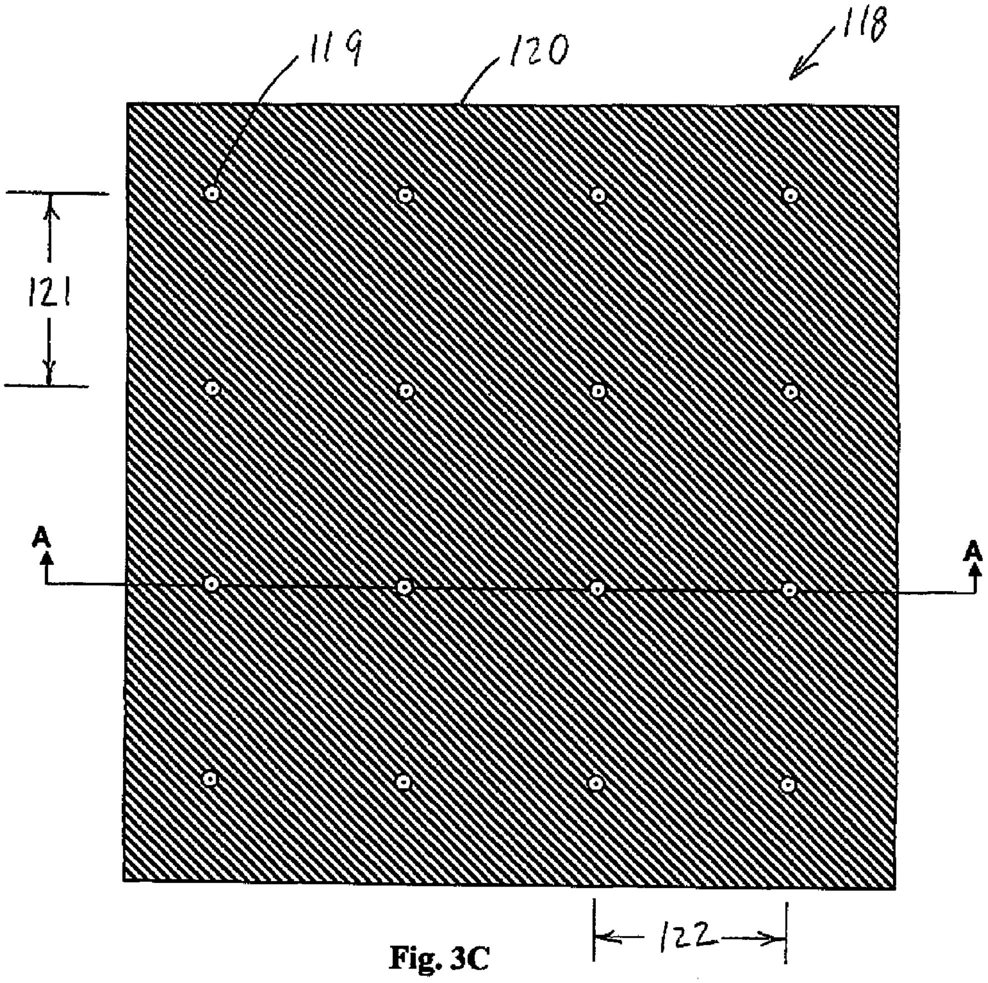
FIG. 3C is a schematic top view of a pattern electrode comprising for an AC electro-hydrodynamic particle aggregation system.
Figure 3D:
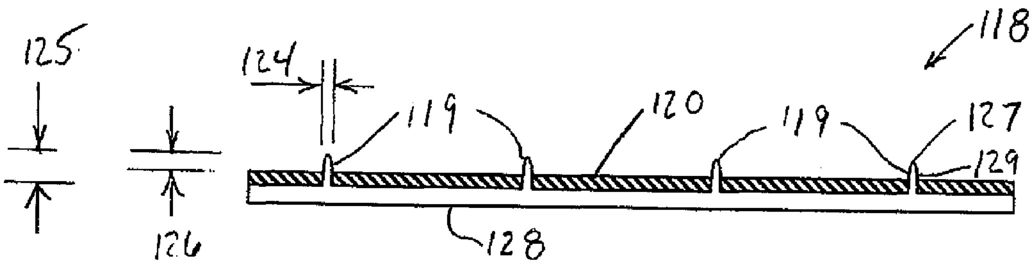
FIG. 3D is a schematic cross-sectional view through Section A-A of the pattern electrode of FIG. 3C.

FIGS. 3C and 3D illustrate a form of a pattern electrode 118 where the conductive pads are needles 119 disposed through openings in a coating 120. As used herein the term "needle" refers to a conductor having a length (e.g., 125 in FIG. 3D) that ranges in value from several multiples to an order of magnitude or greater than the width (e.g., 124 in FIG. 3D) of the conductor. The spacing distances 121 and 122 between needles 119 are generally between approximately one hundred microns and one centimeter. The needles 119 typically have a width 124 that is between approximately twenty microns and two millimeters. Generally the needles 119 have a length 125 that may be from approximately fifty microns to five millimeters in length, and 20 micron to 2 mm in diameter. The separation distance 126 from the tips 127 of the needles 119 to the coating 120 may be from approximately twenty microns to five millimeters. The tips 127 of the needles 119 may be blunt, rounded, or sharply pointed. As seen in FIGS. 3C and 3D a plate electrode (e.g., pattern electrode 118) may include a plurality of needles. When a plurality of needles is employed the needles are interconnected by a conductor 128. In alternative embodiments a plate electrode may incorporate only one needle. Some embodiments do not have a coating (e.g., 120) applied around the needle(s). The tips 127 of the needle 119 induce a high electric field that induces fluid flow.

In some embodiments the tips 127 of the needles 119 as shown in FIGS. 3C and 3D may be bent over so that the shafts 129 of the needles are parallel to the plane of the coating 120. In an embodiment where the pattern electrode 188 is used with a wire electrode (e.g., wire electrode 4B of FIG. 1C), the shafts 129 of the needles 119 may be pointed to the wire electrode.

Features of pattern electrodes may also be differentiated with respect to whether they are conductive or insulative, and whether they are islands or strips. Islands and strips are two examples of pads. In the example of FIGS. 3A and 3B, the conductive pads 102 are constructed of conductive material, so the conductive pads 102 are "conductive islands" (and also may be properly characterized as "conductive pads") that all have substantially the same electrical potential. In alternative embodiments (illustrated elsewhere herein) island pads may be constructed of insulative material, and in such embodiments these "insulative islands" (which also may properly be characterized as insulative pads) also all have substantially the same electrical potential.

Figure 4A:
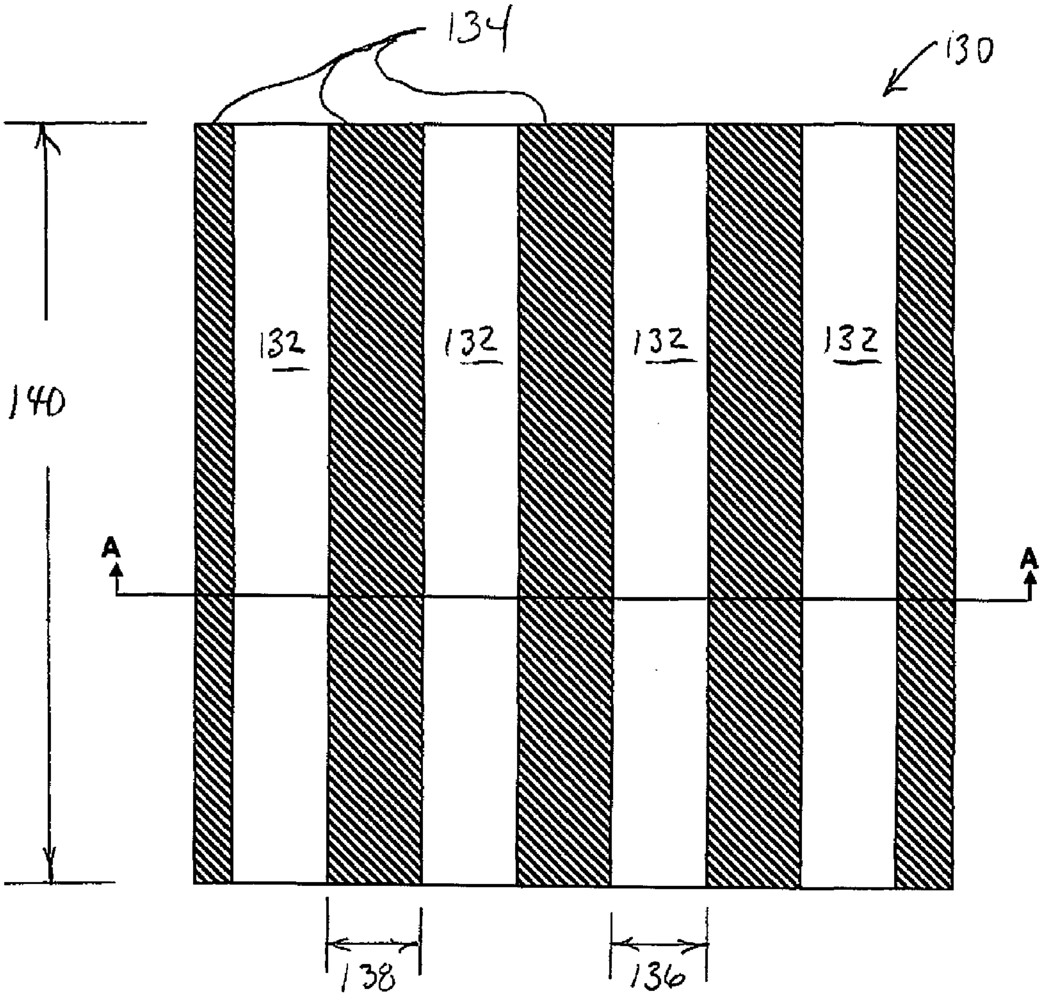
FIG. 4A is a schematic top view of a pattern electrode for an AC electro-hydro-dynamic particle aggregation system.
Figure 4B:
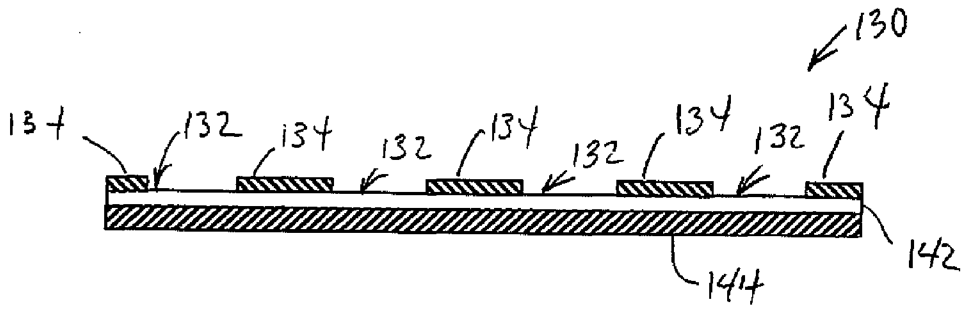
FIG. 4B is a schematic cross-sectional view through Section A-A of the pattern electrode of FIG. 4A.

An alternative embodiment of a pattern electrode 130 is depicted in FIGS. 4A and 4B. In the example of FIGS. 4A and 4B, strips 132 are constructed of conductive material, and they are therefore conductive strips (and also may be properly characterized as conductive pads or "strip pads"). In FIGS. 4A and 4B, strips 134 are constructed of insulative material, and the strips 134 are therefore insulative strips (and also may be characterized as "insulative pads" or "strip pads"). Conductive strips 132 are electrically interconnected, but are separated by insulative material 134. Preferably in embodiments employing strip pads, the strip pads (e.g., 132) have a maximum width 136 that is between approximately fifty microns and three millimeters, and the strip pads (e.g., 132) are spaced apart at a distance 138 that is between approximately one hundred microns and three millimeters. The length 140 of each conductive strip 132 is not critical to the operation of the system, but the length 140 generally ranges in value from several multiples to an order of magnitude greater than the width 136 of each conductive pad 132. Further aspects of pattern electrode 130 are seen in FIG. 4B, which illustrates a cross-section view taken through section A-A depicted in FIG. 4A. Conductive pads 132 are seen to be areas of conductor 142 that are exposed by openings in insulative material 134. Some embodiments may include a substrate 144 to provide physical support for conductor 142.

Figure 5:
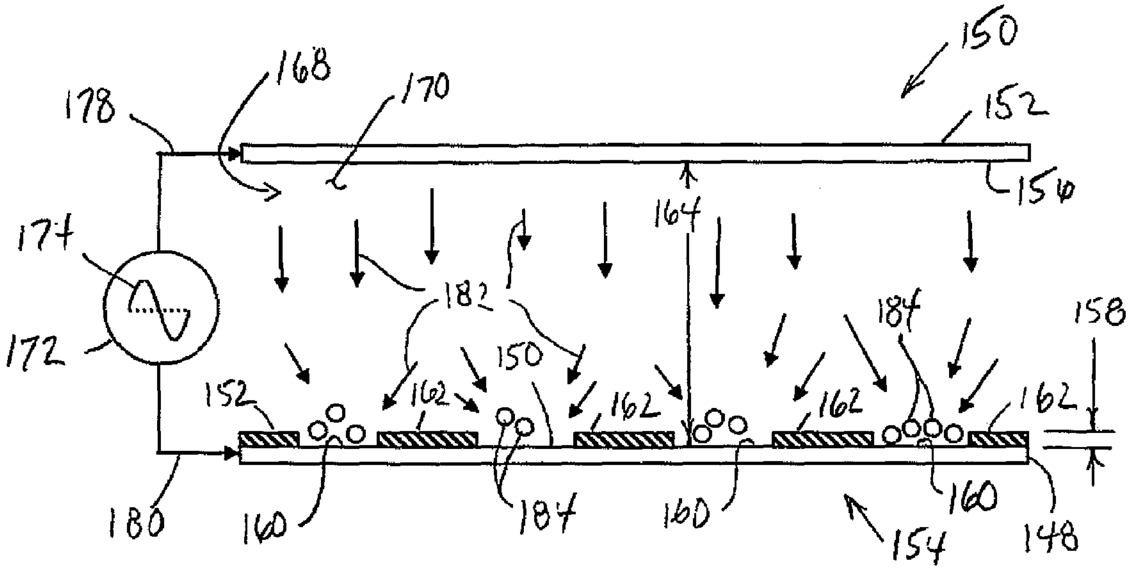
FIG. 5 is a schematic side view of an electro-hydro-dynamic particle aggregation system showing a plate electrode and a pattern electrode and a signal generator.

FIG. 5 illustrates an aggregation system 150 that has a plate electrode 152 and a pattern electrode 154. Plate electrode 152 is a uniform electrical conductor and has a first conductive surface 156. In alternate embodiments a wire electrode (such as wire electrode 4B of FIG. 1C) or a point electrode or a mass electrode may be substituted for the plate electrode 152. Pattern electrode 154 has a uniform electrical conductor 158 that has a series of conductive pads 160 that are exposed by openings in an insulative material 162. The top view of pattern electrode 154 may be similar to the top view of pattern electrode 100 in FIG. 3A, or it may be similar to the top view of pattern electrode 130 in FIG. 4A. Plate electrode 152 and pattern electrode 154 have a separation distance 164 that preferably ranges from approximately one hundred microns to three millimeters. The insulative material 162 has a thickness 158. Note that separation distance 164 is measured between conductive surface 156 and the surface of conductive pad 160 that is closest to conductive surface 156.

The spatial volume 168 defined by first plate electrode 152 and second plate electrode 154 and separation distance 164 is filled with fluid 170 that is electrolytic in nature and that contains entrained particles.

Aggregation system 150 also includes a signal generator 172 that produces a time-varying signal 174. Time-varying signal 174 is preferably sinusoidal. Time-varying signal 174 is provided across plate electrode 152 through first connection 178 and conductor 158 of pattern electrode 154 through second connection 180. Time-varying signal 174 induces voltage changes on conductive surface 156 and on conductive pads 160 creating micro-flow vectors 182 that maintain steady particle migration. In the configuration depicted in FIG. 5, the flow is substantially stagnate on conductive pads 160 and consequently particles 184 collect on the conductive pads 160.

In FIG. 5 the plate electrode 152 is substantially parallel to the pattern electrode 154. In alternate embodiments the plate electrode 152 may not be parallel to the pattern electrode 154. However the plate electrode 152 should be proximal to the pattern electrode 154, meaning that at least a portion of the plate electrode 152 is within the previously described range of separation distance of at least a portion of the pattern electrode 154.

Figure 6:
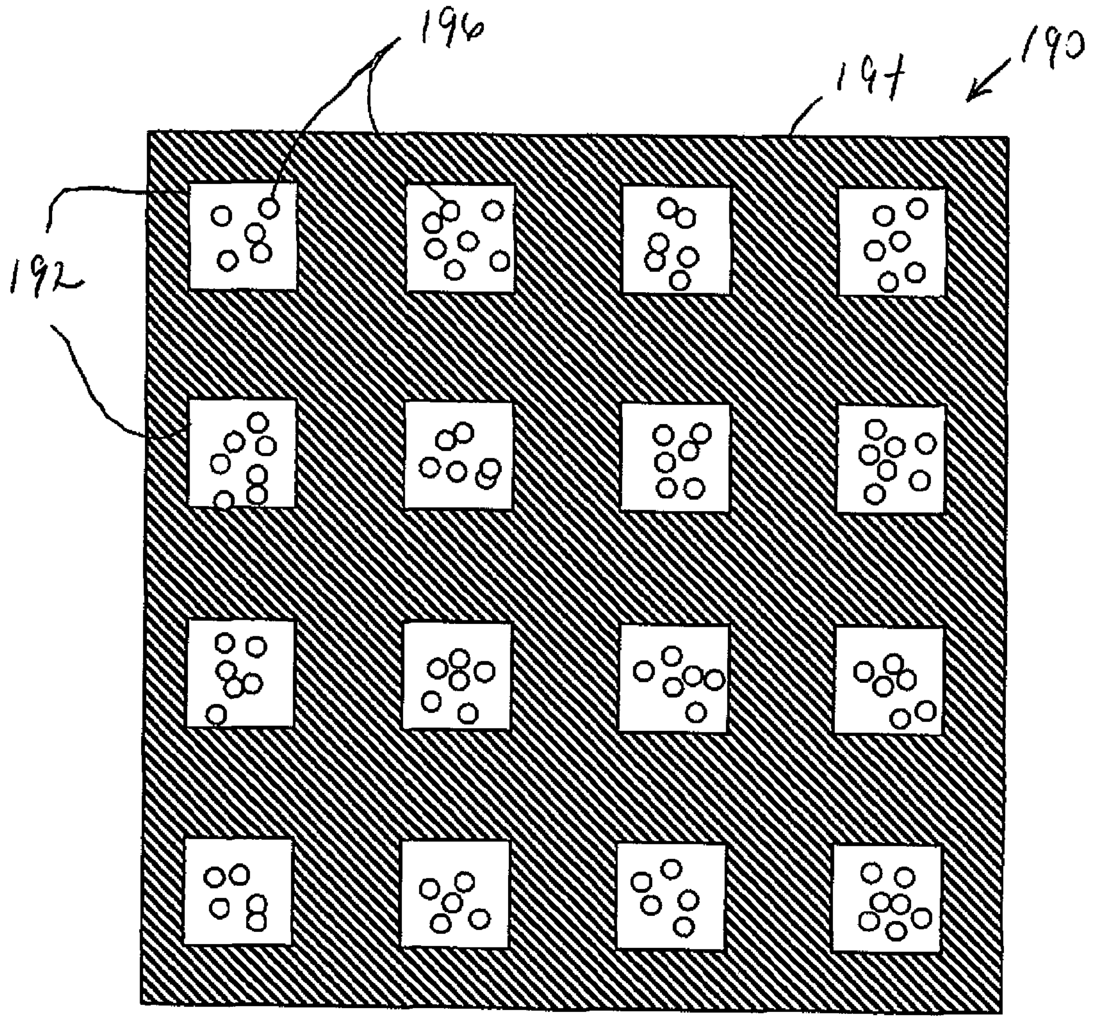
FIG. 6 is a schematic top view of the pattern electrode of FIGS. 3A and 3B with aggregations of particles.

FIG. 6 illustrates the effect of operation of aggregation system 150 of FIG. 5 when pattern electrode 154 is similar to pattern electrode 100 of FIG. 3A. Referring to FIG. 6, pattern electrode 190 has conductive pads 192 that, as shown, are isolated from each other by insulative material 194. Particles 196 have accumulated on conductive pads 192.

Figure 7:
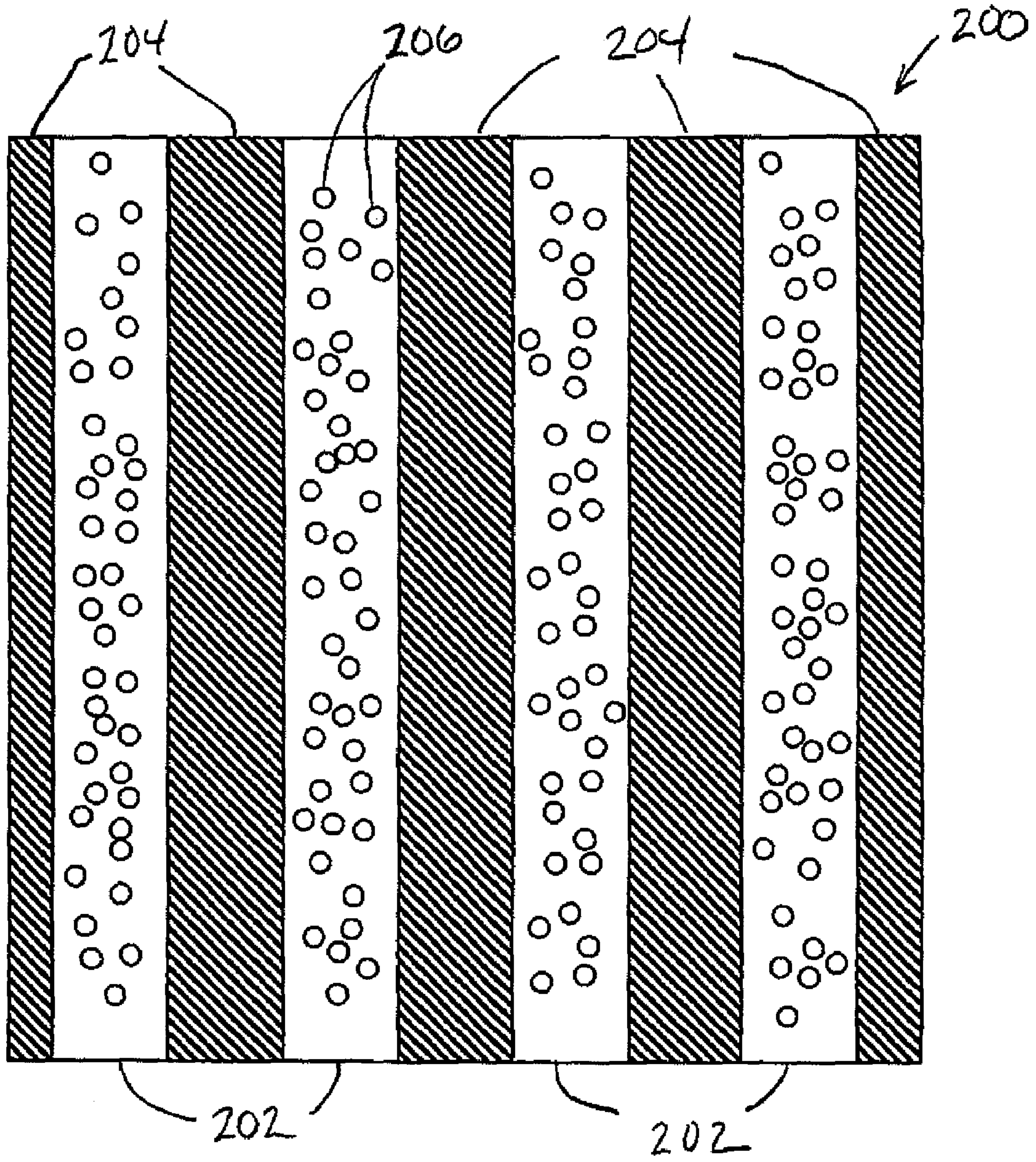
FIG. 7 is a schematic top view of the pattern electrode of FIGS. 4A and 4B with aggregations of particles.

FIG. 7 illustrates the effect of operation of aggregation system 150 of FIG. 5 when pattern electrode 154 is similar to pattern electrode 130 of FIG. 4A. Referring to FIG. 7, pattern electrode 200 has conductive pads 202 that, as shown, are isolated from each other by insulative material 204. Particles 206 have accumulated on conductive pads 202.

Figure 8A:
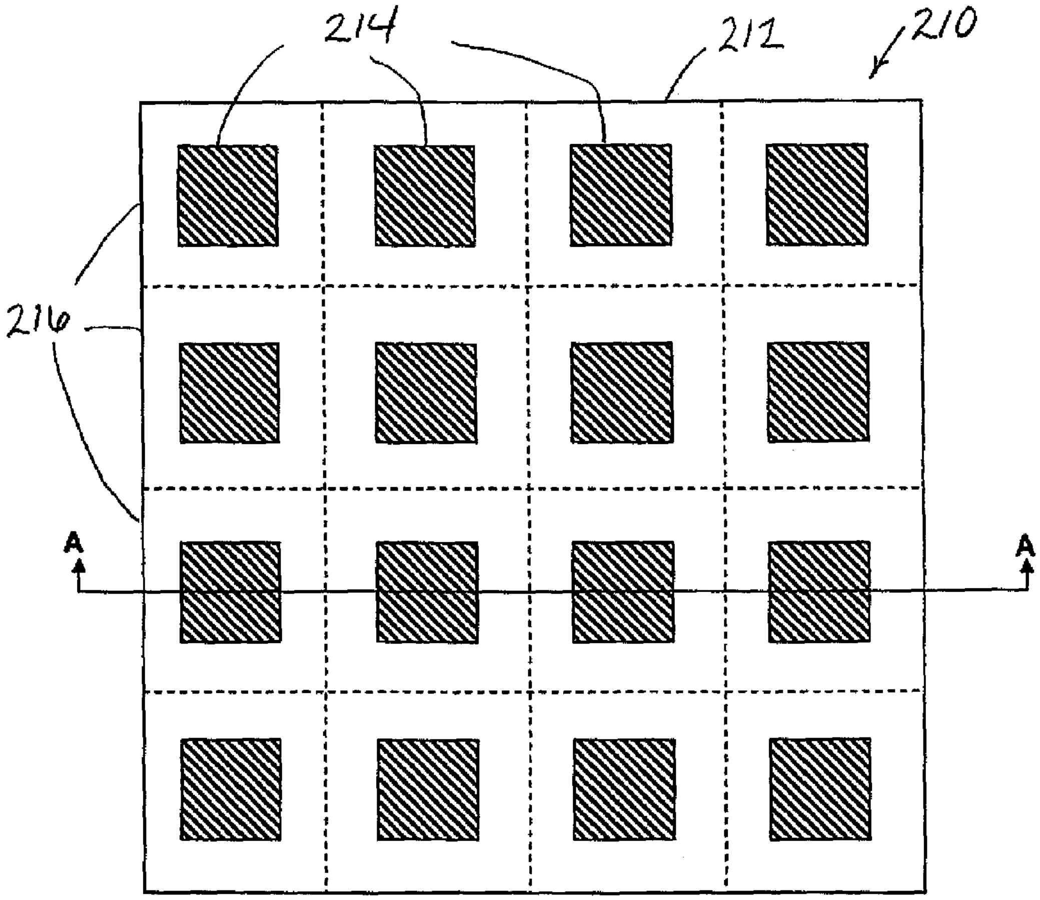
FIG. 8A is a schematic top view of a pattern electrode for an AC electro-hydro-dynamic particle aggregation system.
Figure 8B:
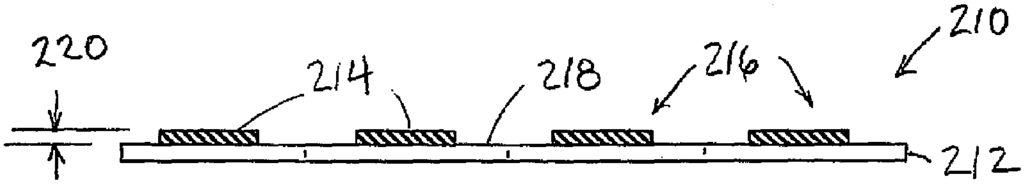
FIG. 8B is a schematic cross-sectional view through Section A-A of the pattern electrode of FIG. 8A.

As previously indicated, in some embodiments island pads may be constructed of insulative material. Such an embodiment is illustrated in FIGS. 8A and 8B. Pattern electrode 210 includes a conductive plate 212 that has a series of insulative island pads 214 disposed on the conductive plate 212. The insulative island pads 214 are not interconnected. Pattern electrode 210 may be considered to incorporate an interconnected, adjoining four-by-four array of conductive island pads 216. These sixteen conductive island pads 216 are defined in part by the dashed lines in FIG. 8A. The dashed lines of FIG. 8A are phantom lines used to illustrate the sixteen conductive island pads 216; the dashed lines do not represent physical features of pattern electrode 210. Each conductive island pad 216 is similar to the conductive island pad 66 illustrated in FIG. 2D.

Further aspects of pattern electrode 210 are seen in FIG. 8B, which illustrates a cross-section view taken through section A-A as designated in FIG. 8A. A conductive surface 218 is shown on conductive plate 212. The insulative island pads 214 typically have a thickness (e.g., thickness 220 in FIG. 8B) that is typically at least one order of magnitude less than the separation distance 164 (FIG. 5), although in some embodiments the thickness 220 of island pads 214 may be as much as one fifth of the separation distance between plate electrodes in an AC electro-hydro-dynamic particle aggregation apparatus. When pattern electrode 210 is substituted for the pattern electrode 154 in the aggregation apparatus 150 depicted in FIG. 5, particles accumulate on the conductive surface 218 of conductive plate 212, as illustrated by particles 230 in FIG. 9.

In alternative embodiments, pattern electrodes may take any of a wide variety of additional forms, some of which are illustrated in FIGS. 10A through 10D. In pattern electrodes 240, 242, 244 and 246 the black regions are exposed conductive surfaces and the white regions are insulative surfaces. The conductive surfaces on pattern electrodes 240 and 246 are strip pads and the conductive surfaces on pattern electrodes 242 and 244 are island pads.

Figure 9:
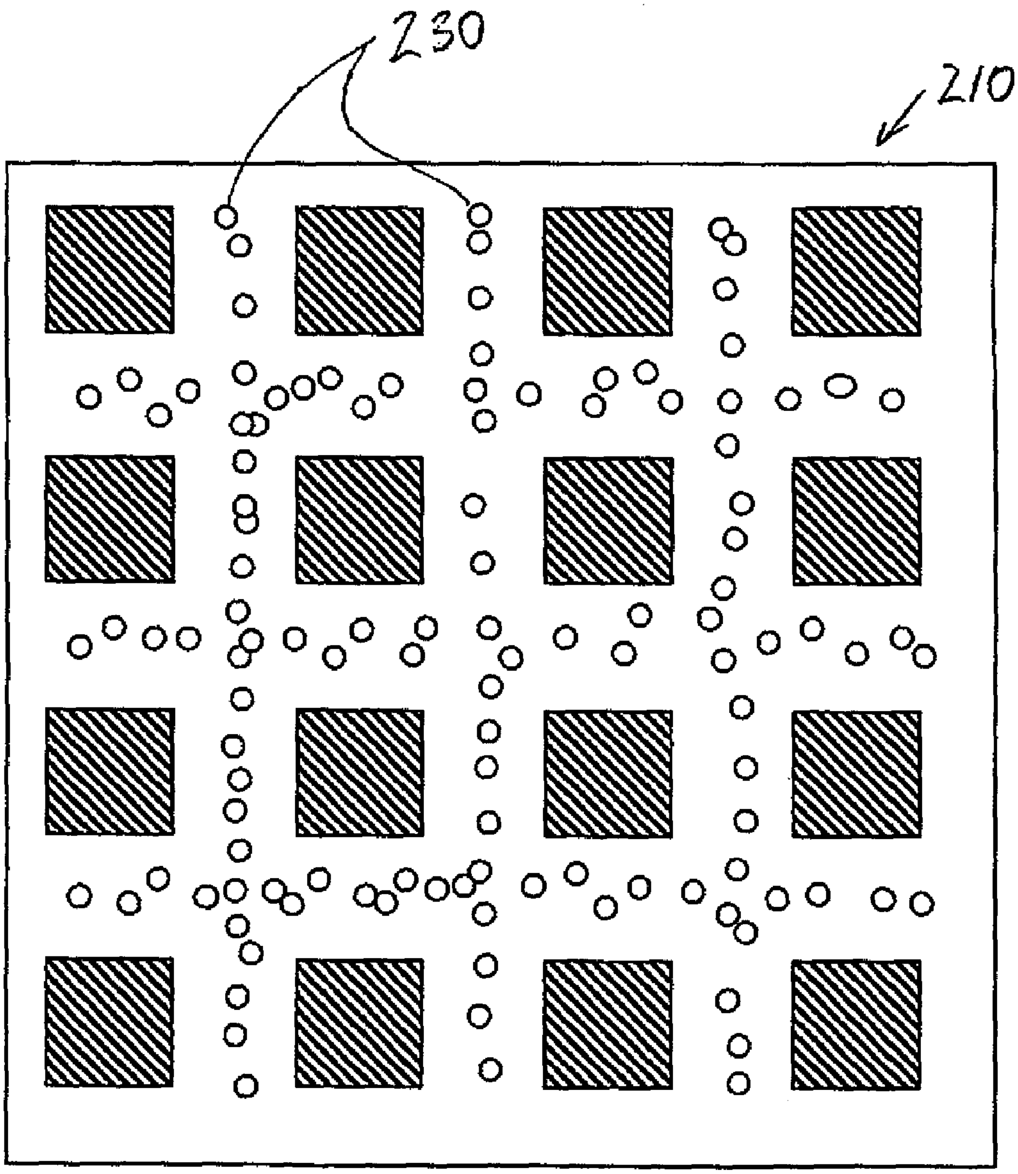
FIG. 9 is a schematic top view of the pattern electrode of FIGS. 8A and 8B with aggregations of particles.
Figure 10A:
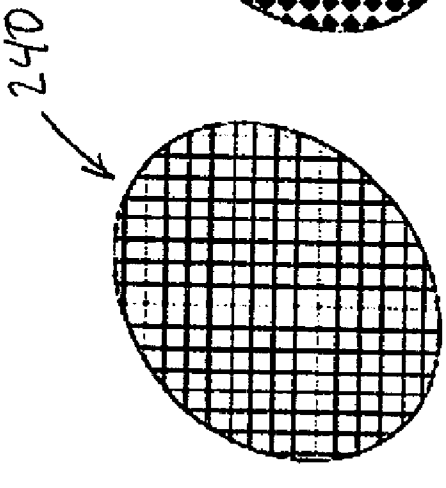
FIGS. 10A-10D are schematic illustrations of alternative configurations of conductive patterns for pattern electrodes in an electro-hydro-dynamic particle aggregation system.
Figure 10B:
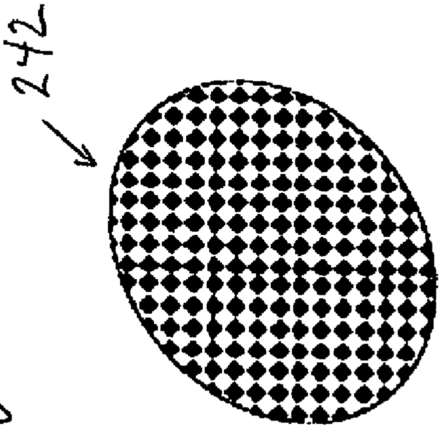
Figure 10C:
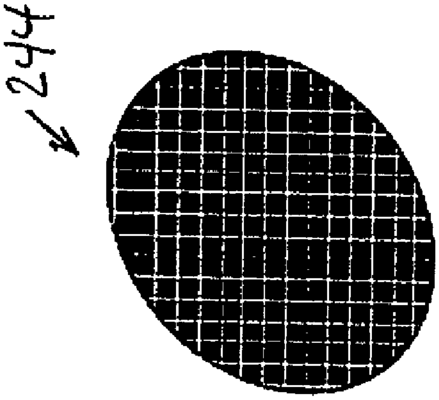
Figure 10D:
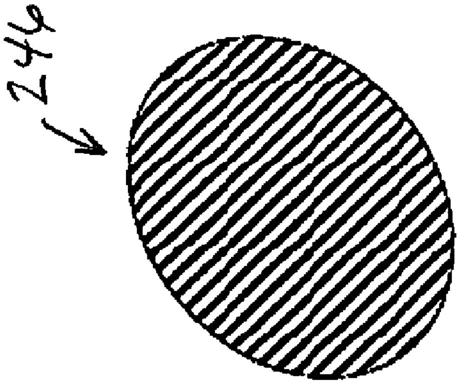
Figure 11:
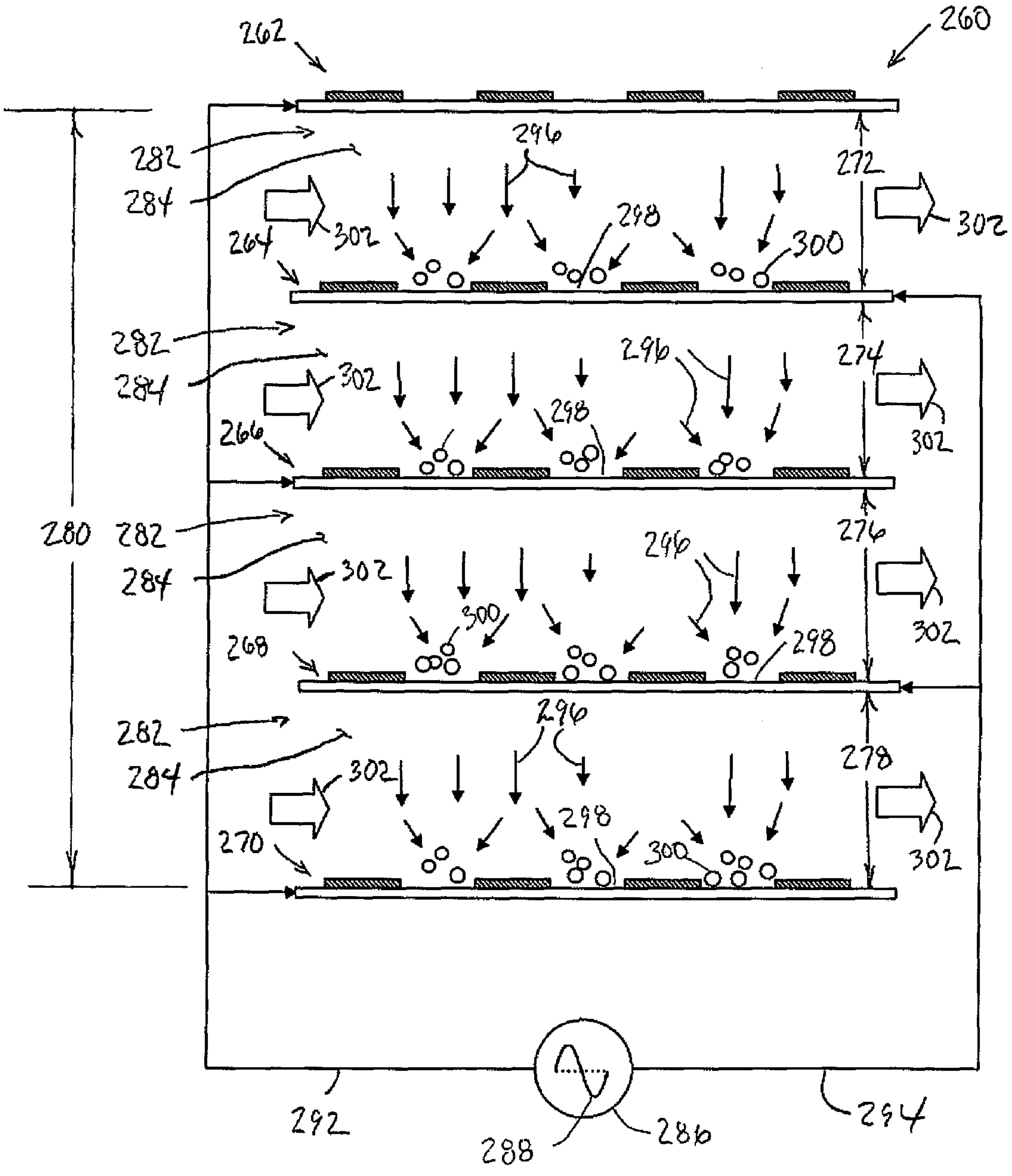
FIG. 11 is a schematic side view of an array of pattern electrodes in an electro-hydro-dynamic particle aggregation system.

FIG. 11 illustrates an aggregation system 260 that utilizes an array of the pattern electrodes 262, 264, 266, 268, and 270, each of which is similar to the pattern electrode 210 that is depicted in FIGS. 8A, 8B, and 9. Preferably pattern electrodes 262, 264, 266, 268, and 270 are congruent in shape, meaning that each has the same outline dimensions. Alternate electrodes in an array may be designated as "first" and "second" sets. For example, pattern electrodes 262, 266, and 270 may be considered to be the "first" set of pattern electrodes, and pattern electrodes 264 and 268 may be considered to be the "second" set of pattern electrodes. Alternatively, pattern electrodes 262, 266, and 270 may be considered to be the "second" set, and pattern electrodes 264 and 268 may be considered to be the "first" set. The important principle is that every-other pattern electrode in the array is in the same (arbitrarily designated) "first" or "second" set and, as seen in FIG. 11, the first set and the second set of pattern electrodes are interleaved.

Pattern electrodes 262, 264, 266, 268 and 270 are spaced apart by a set of separation distances 272, 274, 276, and 278 between each pair of adjacent pattern electrodes. In embodiments where only two pattern electrodes are used, the set of separation distances between each pair of adjacent pattern electrodes is a single separation distance. The separation distances 272, 274, 276, and 278 between pattern electrodes 262, 264, 266, 268 and 270 are preferably equal separation distances and that equal separation distance is preferably between approximately one hundred microns and three millimeters. The space between pattern electrodes 262, 264, 266, 268 and 270 over length 280 forms a spatial volume 282 that is filled with fluid 284 that is electrolytic in nature and that contains entrained particles. In preferred embodiments the spatial volume 282 forms a geometric cylinder; and in such a configuration the pattern electrodes are said to be aligned with each other.

Aggregation system 260 includes a signal generator 286 that produces a time-varying signal 288. Time-varying signal 288 is preferably sinusoidal as shown. If pattern electrodes 262, 266, and 270 are considered to be the "first" set, and pattern electrodes 264 and 268 are considered to be the "second" set, then (as illustrated in FIG. 11), time-varying signal 288 is provided to the first set of pattern electrodes through first connection 292 and to the second set of pattern electrodes through second connection 294. Time-varying signal 288 induces capacitive charging at the electrode surfaces, which induces micro fluidic flow, as indicated by micro-flow vectors 296. Micro-flow vectors 296 stagnate at conductive island pads 298, where particles 300 accumulate.

Aggregation system 260 may incorporate a fluid pump (not shown) to induce movement of fluid 284 through aggregation system 260, as illustrated by fluid macro-flow vectors 302. The maximum feasible rate of movement of fluid 284 through aggregation system 260 is dependent upon many factors including the concentration of particles in the fluid, the desired effectiveness of particle removal, and the speed of the aggregation process (which depends upon the electrolytic characteristics of the fluid, the total electrode surface area of the apparatus, and many other factors).

Figure 12:
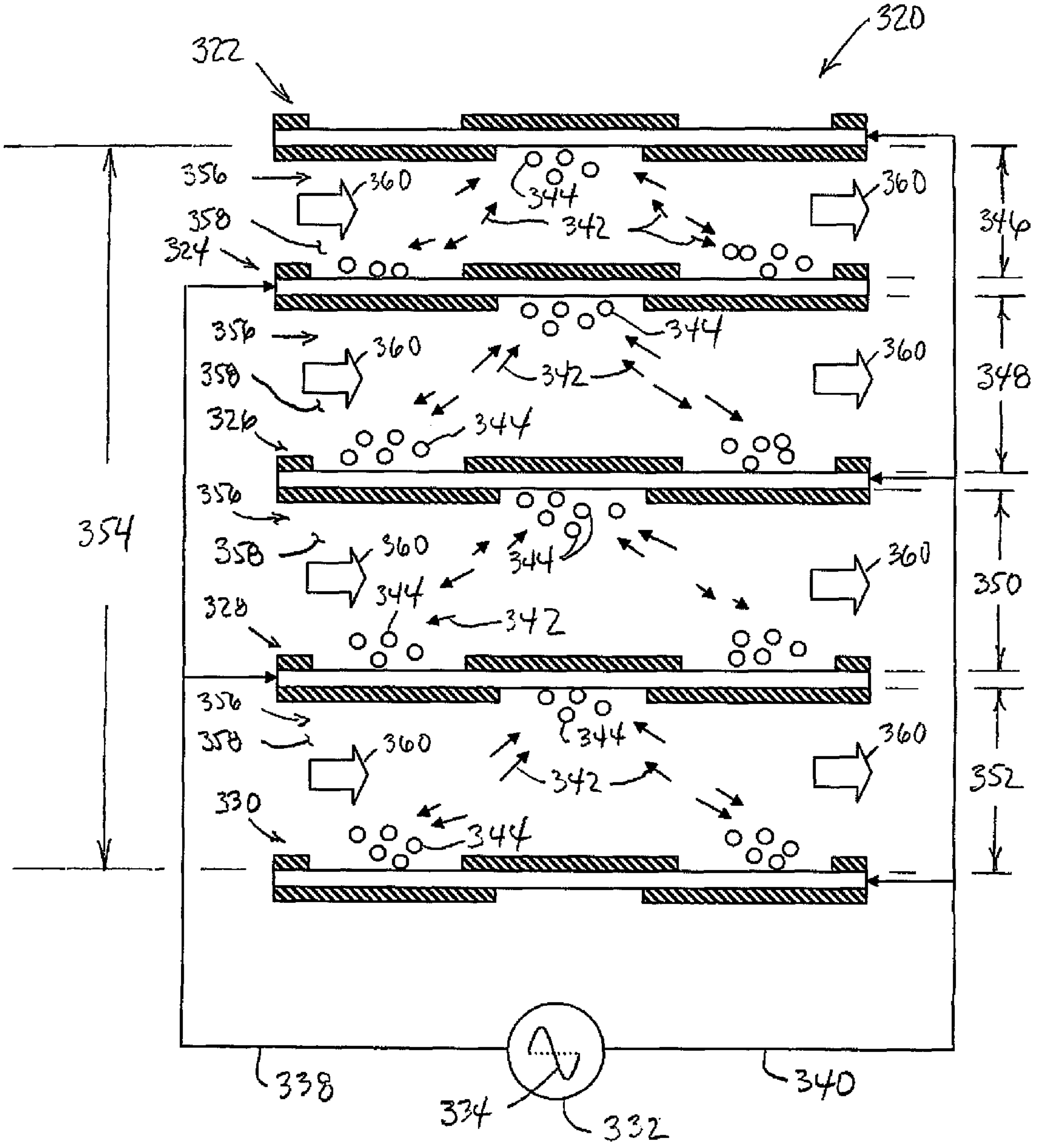
FIG. 12 is a schematic side view of an array of alternative pattern electrodes in an electro-hydro-dynamic particle aggregation system.

FIG. 12 illustrates an alternative embodiment of an aggregation system 320. Aggregation system 320 utilizes an array of pattern electrodes, 322, 324, 326, 328, and 330. The set of separation distances 346, 348, 350, and 352 between pattern electrodes 322, 324, 326, 328 and 330 over length 354 forms a spatial volume 356 that is filled with fluid 358 that is electrolytic in nature and contains entrained particles. Note that spatial orientation is arbitrary in FIG. 12 (as well as FIG. 11 and other figures depicting arrays of plate electrodes). That is, pattern electrodes 322, 324, 326, 328 and 330 may be stacked vertically in a fluid chamber or they may be stacked horizontally such as sidewalls in a fluid chamber or a pathway or a channel. Aggregation system 320 includes a signal generator 332 that produces a time-varying signal 334 that is preferably sinusoidal, as shown. Pattern electrodes 322, 326, and 330 may be designated as the "first" set, and pattern electrodes 324 and 328 are then designated as the "second" set, and (as illustrated in FIG. 12) the first set and the second set of pattern electrodes are interleaved. A time-varying signal 334 is provided across the first and second set of pattern electrodes through first connection 338 and second connection 340. In operation, micro-flow vectors 342 move particles 344 to stagnant flow areas on pattern electrodes 322, 324, 326, 328 and 330. Aggregation system 320 may incorporate a fluid pump (not shown) to induce movement of fluid 358 through aggregation system 320, as illustrated by fluid macro-flow vectors 360.

Figure 13:
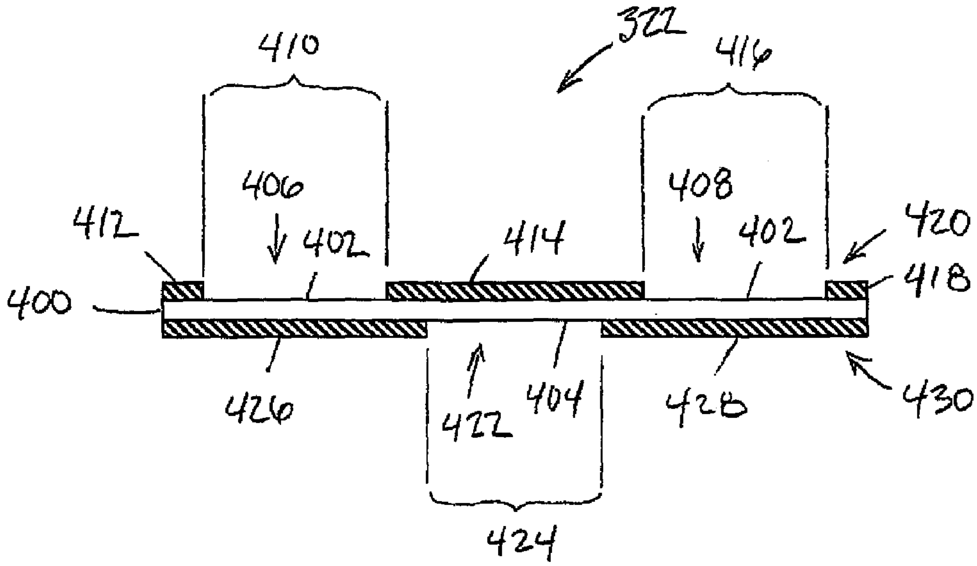
FIG. 13 is a schematic cross-sectional view of a pattern electrode.

In the embodiment of FIG. 12 the pattern electrodes 322, 324, 326, 328 and 330 have substantially identical features. Further details of these features are illustrated in FIG. 13 where pattern electrode 322 is depicted as an example. Pattern electrode 322 has a conductor 400 with a first conductive surface 402 and a second conductive surface 404. First conductive surface 402 has first and second conductive pads 406 and 408. The extent 410 of first conductive pad 406 is defined by insulative material 412 and 414. The extent 416 of second conductive pad 408 is defined by insulative material 414 and 418. Insulative material 412, 414, and 418, in combination with first conductive pad 406 and second conductive pad 408, forms a conductive pattern 420 on pattern electrode 322. A "conductive pattern" is characterized by an alternating series of adjoining conductive and insulative surfaces.

Second conductive surface 404 has a third conductive pad 422. The extent 424 of third conductive pad 422 is defined by insulative material 426 and 428. Insulative material 426 and 428 in combination with third conductive pad 404 form a second conductive pattern 430 on pattern electrode 322. First conductive pattern 420 and second conductive pattern 430 are said to be "complementary conductive patterns" because (1) first conductive pattern 420 and second conductive pattern (430) are on opposite sides of a pattern electrode (e.g., 322), and (2) the conductive pad(s) (e.g., 406 and 408) on the first conductive pattern (e.g., first conductive pattern 420) of the pattern electrode has (have) insulative material (e.g., 426 and 428) covering the area opposing the conductive pads (e.g., 406 and 408) on the second conductive pattern (e.g., second conductive pattern 430), and (3) the conductive pad(s) (e.g., 422) on the second conductive pattern (e.g., second conductive pattern 430) of the pattern electrode has (have) insulative material (e.g., 414) covering the area opposing the conductive pad(s) (e.g., 422) on the first conductive pattern (e.g., first conductive pattern 420).

In FIGS. 11 and 12 the pattern electrodes (262, 264, 266, 268 and 270 in FIGS. 11 and 322, 324, 326, 328 and 330 in FIG. 12) are substantially parallel. In alternate embodiments the pattern electrodes may not be parallel. However the pattern electrodes should be proximal meaning that at least a portion of each pattern electrode is within the previously described range of separation distance from its adjacent pattern electrode(s).

Figure 14:
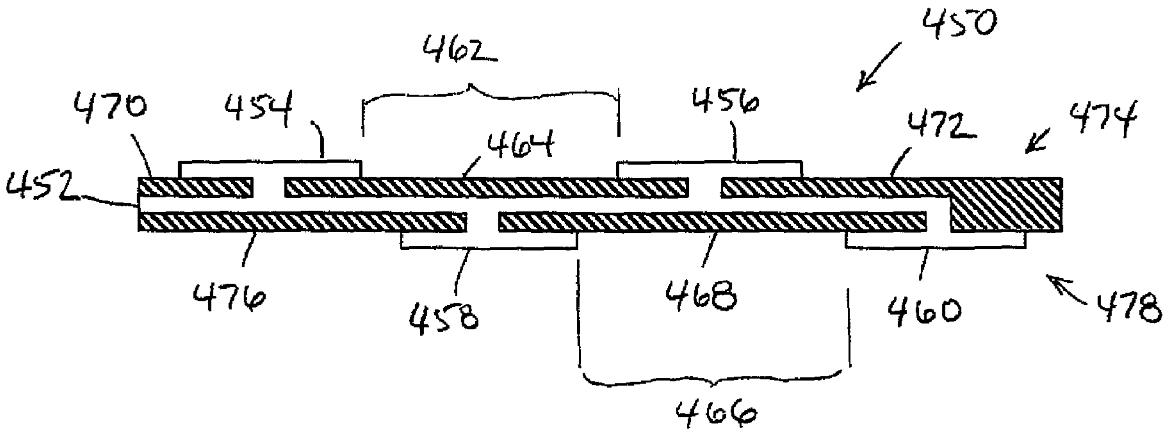
FIG. 14 is a schematic cross-sectional view of a pattern electrode.

FIG. 14 illustrates an alternative embodiment of complementary conductive patterns in a pattern electrode 450. Pattern electrode 450 includes a conductor 452 that forms four conductive pads 454, 456, 458, and 460. Conductive pads 454 and 456 are separated by a region 462 of a first insulative material 464, and conductive pads 458 and 460 are separated by a region 466 of a second insulative material 468. Conductive pads 454 and 456, in combination with insulative materials 470, 464, and 472, form a first conductive pattern 474. Conductive pads 458 and 460, in combination with insulative materials 476, 468 and 472, form a second conductive pattern 478. First conductive pattern 474 and second conductive pattern 478 are complementary conductive patterns because they meet the previously defined criteria for complementary conductive patterns. Namely, (1) first conductive pattern 474 and second conductive pattern 478 are on opposite sides of a pattern electrode (e.g., 450), and (2) the conductive pad(s) (e.g., 454 and 456) on the first conductive pattern (e.g., first conductive pattern 474) of the pattern electrode has (have) insulative material (e.g., 464 and 468) covering the area opposing the conductive pads (e.g., 454 and 456) on the second conductive pattern (e.g., second conductive pattern 478), and (3) the conductive pad(s) (e.g., 458 and 460) on the second conductive pattern (e.g., second conductive pattern 478) of the pattern electrode has (have) insulative material (e.g., 464 and 472) covering the area opposing the conductive pad(s) (e.g., 458 and 460) on the first conductive pattern (e.g., first conductive pattern 474).

Figure 15:
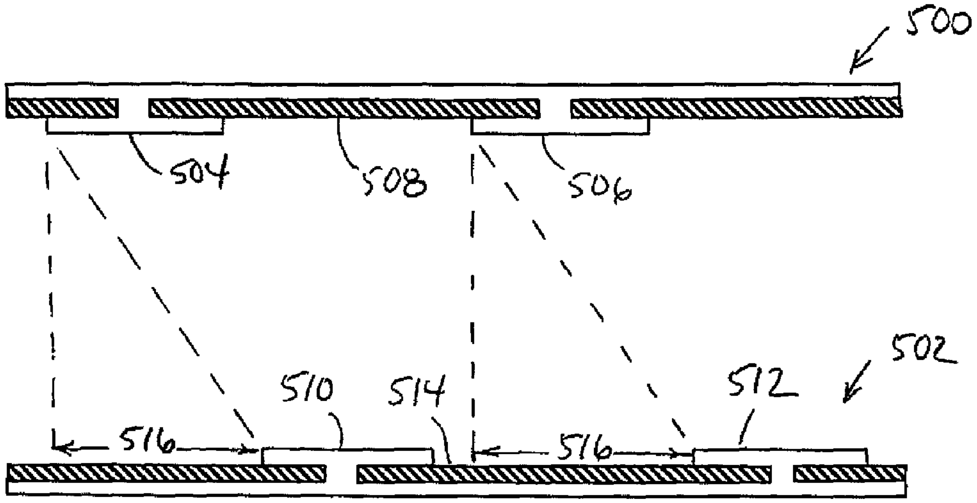
FIG. 15 is a schematic cross-sectional view of two pattern electrodes.

FIG. 15 illustrates another embodiment of pattern electrodes, first pattern electrode 500 and second patterned electrode 502. First patterned electrode 500 has two conductive pads 504 and 506 separated by insulative material 508. Second patterned electrode has two conductive pads 510 and 512 separated by insulative material 514. The conductive pads 510 and 512 are seen to be laterally offset from conductive pads 504 and 506 by lateral offset distance 516. The tangential fields are stronger when conductive patterns on different plates are laterally offset from each other. In embodiments where conductive pads are strip pads, the lateral offset need only occur in the direction orthogonal to the longitudinal dimensions of the strip pads. In embodiments where conductive pads are island pads the lateral offset need only occur in one lateral direction, but lateral offset in both orthogonal lateral directions is preferred. A reference to a lateral offset of conductive pads refers to a lateral offset that occurs in the direction orthogonal to the longitudinal axes of the strip pads and a lateral offset that occurs in at least one lateral direction of island pads.

Figure 16:
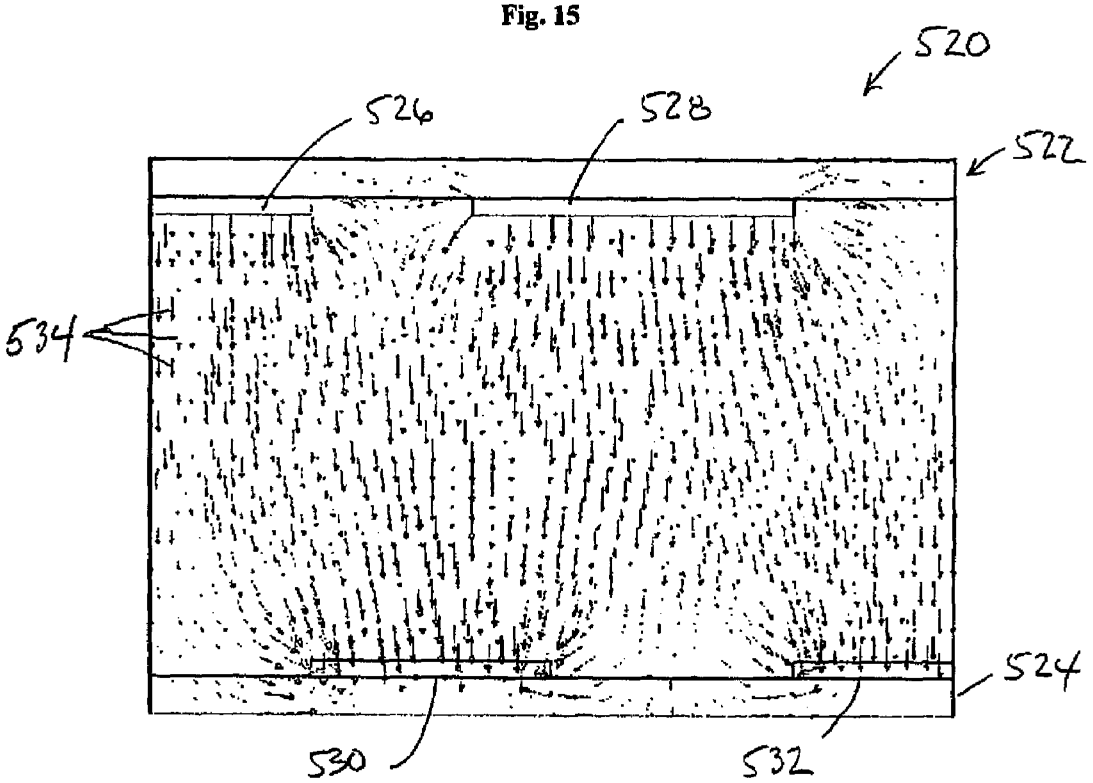
FIG. 16 is a graphic representation of a finite element analysis of an AC electro-hydro-dynamic aggregation system.

FIG. 16 illustrates a finite element analysis (FEA) 520 of electrical field distribution of a pair of pattern electrodes 522 and 524 similar to pattern electrodes 500 and 502 in FIG. 15. Pattern electrode 522 has two conductive pads 526 and 528. Pattern electrode 524 has two conductive pads 530 and 532. FIG. 16 illustrates electric field vectors 534 (analogous to the micro-flow vectors depicted in FIGS. 5, 11, and 12) calculated by the finite element analysis.

Figure 17A:
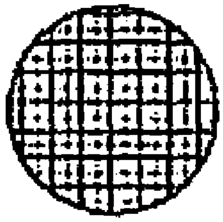
FIG. 17A is a schematic view of a patterned side of a pattern electrode.
Figure 17B:
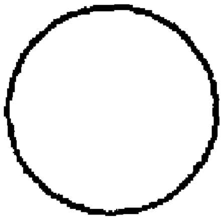
FIG. 17B is a schematic view of the opposing side of the pattern electrode of FIG. 17A, showing a smooth face.
Figure 17C:
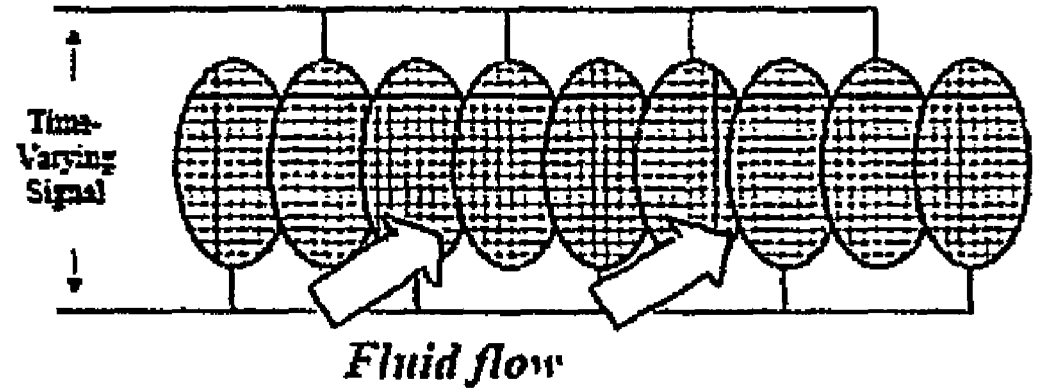
FIG. 17C is a schematic view of fluid flow through an array of pattern electrodes as depicted in FIGS. 17A and 17B, as viewed from the pattern sides of the pattern electrodes.
Figure 17D:
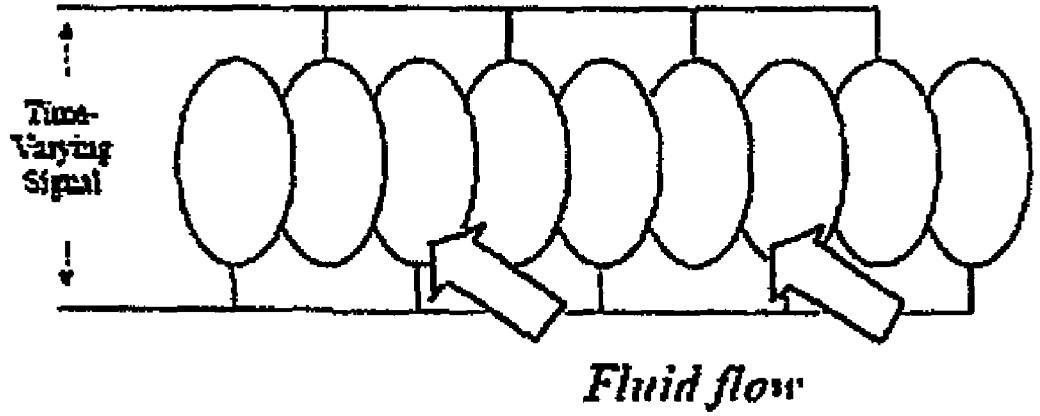
FIG. 17D is a schematic view of fluid flow through an array of pattern electrodes as depicted in FIGS. 17A and 17B, as viewed from the smooth sides of the pattern electrodes.

The parallel plate technique may be expanded to form an array as depicted in FIGS. 17A-17D for treating large fluid volume. FIGS. 17A and 17B depict two sides of a particle trapping plate, also properly characterized as a pattern electrode. FIG. 17A illustrates a patterned side to trap particles, and FIG. 17B illustrates a bare side to apply an electrical field. FIG. 17C shows fluid flow through the array as viewed from the patterned side of the trapping plate, and FIG. 17D shows fluid flow through the array as viewed from the bare side of trapping plate. A voltage bias in excitation signals will facilitate the trapping/removal of charged particles such as metallic nanoparticles in contaminated groundwater.

One advantage of the parallel plate technique over interdigitated electrode concentrators is its ability to handle large fluid volume. The spacing between electrodes in a parallel plate system is typically in the millimeter range (e.g., preferably between one hundred microns and three millimeters) whereas in interdigitated systems the active region above the electrodes is generally less than one hundred microns. With the parallel plate system, AC electro-hydro-dynamics may be used for larger scale applications, such as clean-up of contaminated waters. Another advantage of the parallel plate systems is ease of fabrication and ability to scale up the process. Electrode patterning can be done on any conducting surface with conventional techniques such as screen printing. The spacing between the two plates can be increased further by electrode coating (e.g., dielectrics, Nafion), or biasing the electrodes (for instance the trapping electrodes have a negative DC offset), to suppress electrochemical reactions.

EXAMPLE 1

Figure 18:
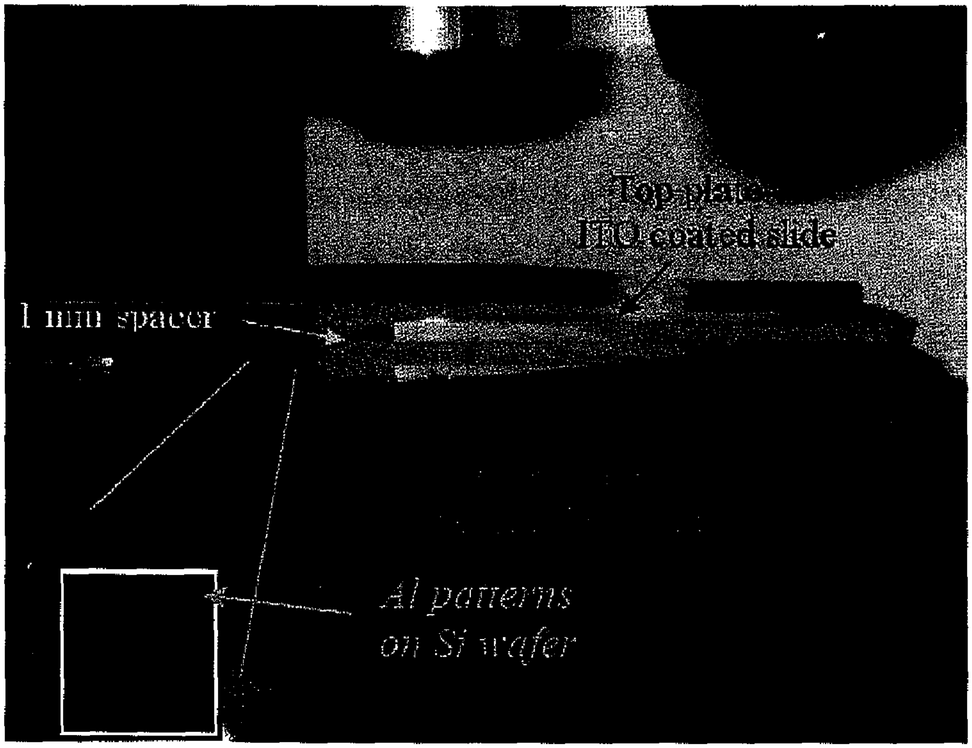
FIG. 18 is a view of an experimental setup for evaluating an AC electro-hydro-dynamic aggregation system.

One experimental setup is shown in FIG. 18. Initial experiments were performed on aluminum electrodes patterned with photoresist, isolated gold strips, and indium tin oxide electrodes. The dimensions were from 600 microns to 2 mm squares and 80 micron by 9 mm strips. The spacing between the two plates was tested up to 1.5 mm. AC signals were from 10 Hz to 10 MHz, 1.5V to 40Vpp. The driving signals were controlled to induce capacitive charging at the electrode surface, which induces micro fluidic flow.

Figure 19:
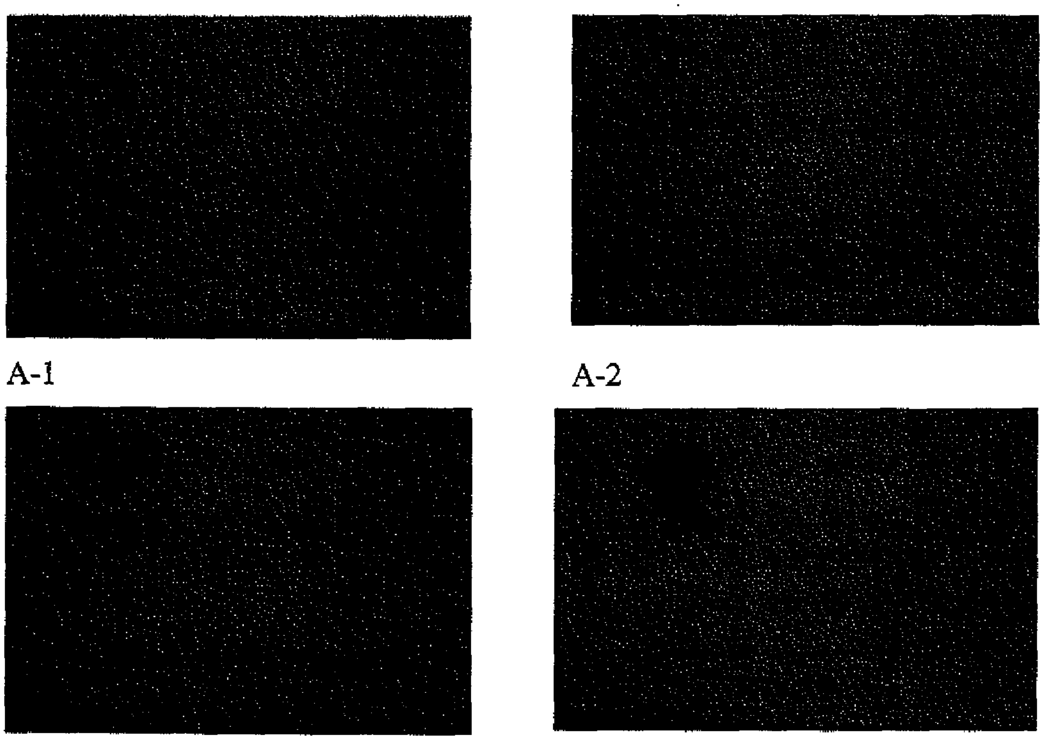
FIG. 19 illustrates the aggregation of particles in an AC electro-hydro-dynamic system as a progression of time from image A-1 to A-2 to A-3 to A-4.

The particle movement was observed using a camera through the glass top plate, which was coated with indium tin oxide (ITO) to conduct electricity. The fluid was contained within the polymer spacer between the top plate and the bottom silicon wafer. The electrode on one plate was patterned (as a particle trapping electrode, or "pattern electrode") to generate non-uniform electric fields at the electrode surface. The patterns on the trapping electrode for one experimental setup are shown as the inset of FIG. 18. The squares were 600 microns on a side. The insulated regions were either coated by dielectrics or etched away. An electric field was applied between the ITO electrode and the patterned electrode. The tangential electric field induced electro-hydrodynamic fluid motion. Induced microfluidic flows then conveyed particles from the bulk of the fluid onto the fluid surface. The particles were trapped at the stagnation points of the fluid in motion and recorded as shown in FIG. 19. FIG. 19 shows a configuration of a trapping electrode with a conducting central surface exposed to fluid which will focus particles to one spot within this conductive surface.

EXAMPLE 2

Figure 20A:
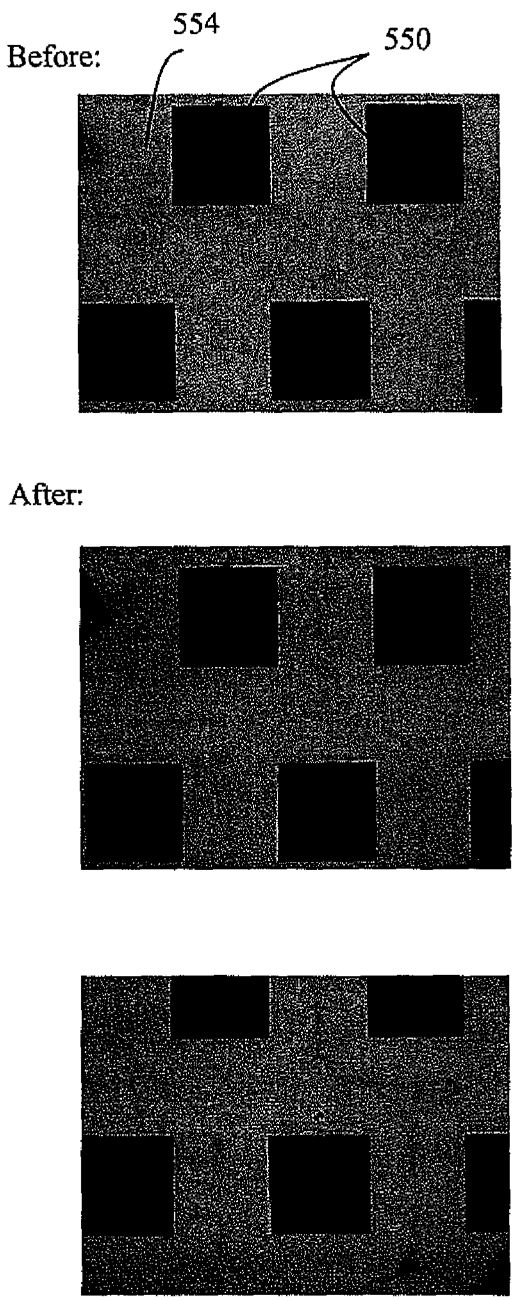
FIGS. 20A and 20B illustrate images of particle aggregation before and after an AC electro-hydro-dynamic system is operated.
Figure 20B:
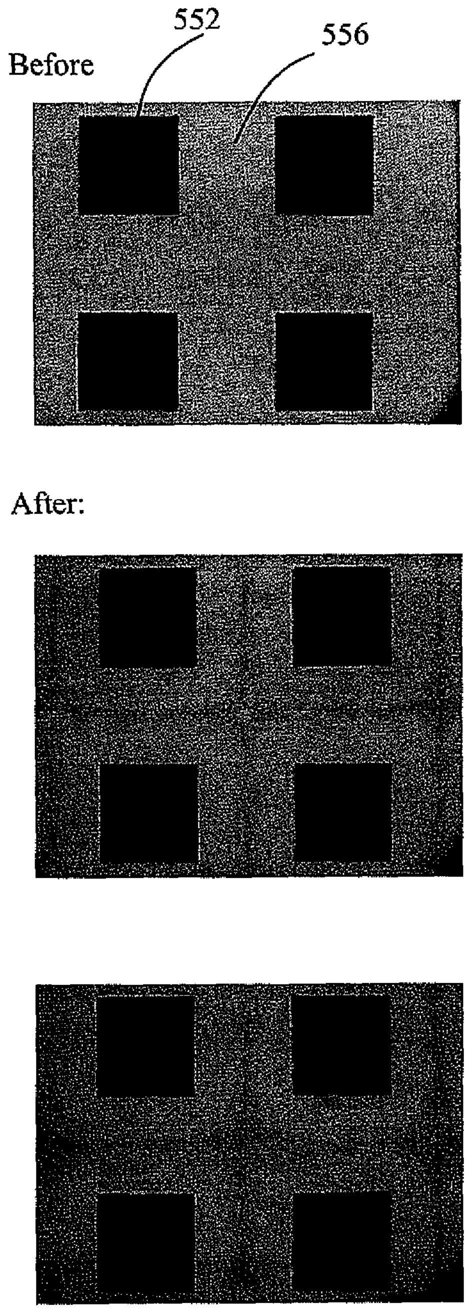

FIGS. 20A and 20B show two different experimental setups that are like the "negative" of the setup depicted in FIG. 19. That is, in FIGS. 20A and 20B, the square elements 550 and 552 are insulative islands, and the spaces 554 and 556 between the insulative islands are conductive surfaces. The setup of FIGS. 20A and 20B is also capable of trapping particles at the stagnation points on the conducting surface. This configuration may be preferable for removing particles since flows are diverging at the stagnation points for this configuration, which further reduces surface flow velocity due to mass flow conservation and assists particle stagnation.

EXAMPLE 3

Figure 21:
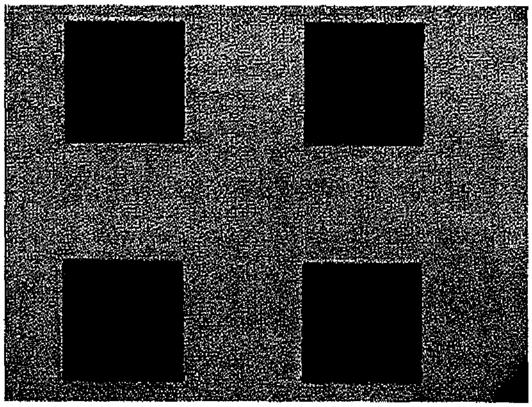
FIG. 21 illustrates the aggregation of particles in an AC electro-hydro-dynamic system as a progression of time.
Figure 21:
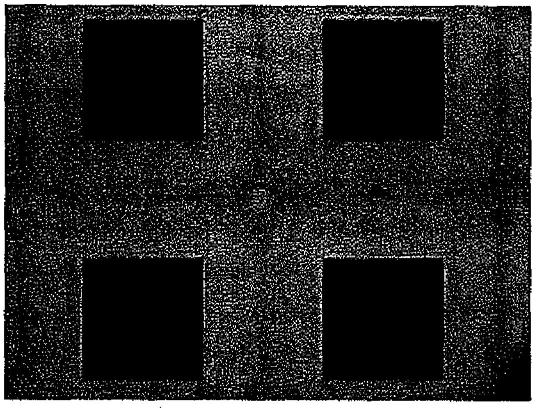
Figure 21:
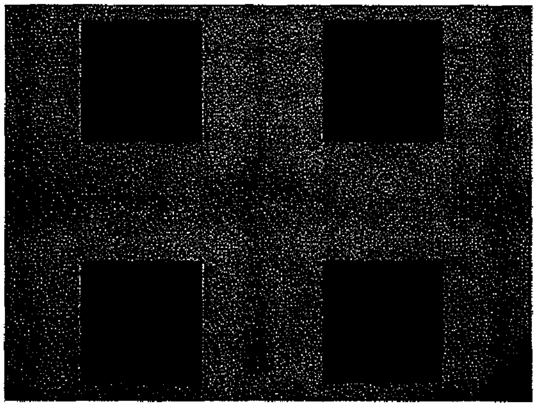

FIG. 21 shows a time series of photos of the concentration processes of bentonite clay particles with the same electrode configuration depicted in FIG. 20B. Bentonite clay particles are nano-size particles. After the electric field is turned on, the particles in the suspension start to accumulate along the centerlines of conductive stripes, which are the stagnation points of micro-flows. Particles were effectively captured from the bulk of the fluid onto electrodes within 5 minutes.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical applications, and to thereby enable one of ordinary skills in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for aggregating particles immersed in a fluid, the apparatus comprising:

a first set of plate electrodes comprising at least two electrically conductive first plate electrodes having a first thickness and a first width and a first length wherein the first width and the first length are each substantially greater than the first thickness and wherein the first width and the first length define a first conductive surface having a first conductive surface area and define an opposing second conductive surface having a second conductive surface area having a first conductive pattern delimited by adjacent insulative material on the at least two first plate electrodes;

a second set of plate electrodes comprising at least two electrically conductive second plate electrodes having a second thickness and a second width and a second length wherein the second width and the second length are each substantially greater than the second thickness and wherein the second width and the second length define a third conductive surface having a third conductive surface area and define an opposing fourth conductive surface having a fourth conductive surface area having a second conductive pattern delimited by adjacent insulative material on the at least two second plate electrodes;

wherein the plate electrodes of the first and second sets are interleaved with each other and are separated by separation distances establishing spaces between adjacent plate electrodes in which the fluid with the immersed particles is disposed, and wherein:

the first conductive surface of each first plate electrode that is disposed between two adjacent second plate electrodes faces the fourth conductive surface of one of the second plate electrodes, and the third conductive surface of each second plate electrode that is disposed between two adjacent first plate electrodes faces the second conductive surface of one of the first plate electrodes, and the fluid with the immersed particles is in contact with the first conductive surface and the second conductive surface of the at least two first plate electrodes and the fluid with the immersed particles is in contact with the third conductive surface and the fourth conductive surface of the at least two second plate electrodes; and a signal generator to provide a time-varying signal across the first conductive pattern and the second conductive pattern, wherein at any point in time a first voltage is provided to the first conductive pattern and a second voltage is provided to the second conductive pattern.

2. The apparatus for aggregating particles immersed in a fluid of claim 1 wherein the first and second set of plate electrodes have outlines that are congruent in shape.

3. The apparatus of claim 1 wherein each separation distance is in a range from approximately ten microns to approximately three millimeters.

4. The apparatus of claim 1 wherein the first conductive surface of each first plate electrode has a first conductive pattern delimited by adjacent insulative material and the first conductive surface of each second plate electrode has a second conductive pattern delimited by adjacent insulative material.

5. The apparatus of claim 1 wherein one or both of the first and second conductive patterns include island pads.

6. The apparatus of claim 5 wherein the island pads each have a maximum surface dimension that is within a range from approximately eighty microns to approximately three millimeters.

7. The apparatus of claim 5 wherein the island pads are spaced apart at a distance that is within a range from approximately one hundred microns to approximately three millimeters.

8. The apparatus of claim 1 wherein one or both of the first and second conductive patterns include strip pads.

9. The apparatus of claim 8 wherein the strip pads each have a width of approximately eighty microns.

10. The apparatus of claim 8 wherein the strip pads are spaced apart at a distance that is within a range from approximately ten microns to approximately three millimeters.

11. An apparatus for aggregating particles immersed in a fluid, the apparatus comprising:

an electrode having a conductive surface;

an electrically conductive first plate electrode disposed proximal to the electrode, the first plate electrode (1) having a thickness and having a width and a length wherein the width and the length are each substantially greater than the thickness, and wherein the width and length define a first plate electrode surface that faces the conductive surface of the electrode, the first plate electrode surface having a plurality of first conductive strip pads delimited by adjacent insulative material on the first plate electrode and (2) having a separation distance from the conductive surface of the electrode, there being a spatial volume between the electrode and the first plate electrode in which the fluid with the immersed particles is disposed; and a signal generator to provide a time-varying signal across the conductive surface and the plurality of first conductive strip pads, wherein at any point in time the voltage provided to each first conductive strip pad is equivalent to the voltage provided to each of the other first conductive strip pads.

12. The apparatus of claim 11 wherein the separation distance is a distance within a range from approximately one millimeter to approximately one and a half millimeters.

13. The apparatus of claim 11 wherein the electrode comprises a wire.

14. The apparatus of claim 11 wherein the conductive strip pads each have a width of approximately eighty microns.

15. The apparatus of claim 11 wherein the conductive strip pads are spaced apart at a distance that is within a range from approximately ten microns to approximately three millimeters.

16. The apparatus of claim 11 wherein the electrode is an electrically conductive second plate electrode and the conductive surface of the second plate electrode includes a plurality of second conductive strip pads delimited by adjacent insulative material on the second plate electrode wherein said second conductive strip pads are laterally offset from said first conductive strip pads.

17. The apparatus of claim 11 wherein the signal generator provides a time-varying signal that has a peak-to-peak voltage between approximately one half volt to one hundred volts and wherein the signal generator provides a time-varying signal that varies at a frequency that is within a range from approximately ten Hz to approximately ten MHz.

18. An apparatus for aggregating particles immersed in a fluid, the apparatus comprising:

a first set of electrically conductive plate electrodes having a first and a second complementary pattern of conductive pads wherein the first complementary pattern and the second complementary pattern are delimited by adjacent insulative material on opposite sides of each electrically conductive plate electrode in the first set of plate electrodes;

a second set of electrically conductive plate electrodes having a third and a fourth complementary pattern of conductive pads wherein the first and second set of plate electrodes are interleaved with each other and wherein the third complementary pattern and the fourth complementary pattern are delimited by adjacent insulative material on opposite sides of each electrically conductive plate electrode in the second set of plate electrodes, and wherein the first complementary pattern has insulative material opposing each conductive pad of the fourth complementary pattern and wherein the third complementary pattern has insulative material opposing each conductive pad of the second complementary pattern and wherein the first and second set of plate electrodes are separated by separation distances establishing spaces between adjacent plate electrodes in which the fluid with the immersed particles is disposed; and a signal generator to provide a time-varying signal across the first and second sets of plate electrodes.

19. The apparatus of claim 18 wherein the first complementary pattern of conductive pads is substantially identical to the third complementary pattern of conductive pads and the second complementary pattern of conductive pads is substantially identical to the fourth complementary pattern of conductive pads.

20. The apparatus of claim 18 wherein the first, second, third, and fourth complementary pattern of conductive pads comprise island pads.

21. The apparatus of claim 18 wherein the first, second, third, and fourth complementary pattern of conductive pads comprise strip pads.

22. An apparatus for aggregating particles immersed in a fluid, the apparatus comprising:

an electrically conductive first plate electrode having a first thickness and a first width and a first length where the first width and the first length are each substantially greater than the first thickness and wherein the width and the first length define a first surface plane having a plurality of first conductive island pads delimited by adjacent insulative material on the first plate electrode;

an electrically conductive second plate electrode disposed proximal to the first plate electrode, the second plate electrode having a second thickness and a second width and a second length where the second width and the second length are each substantially greater than the second thickness and wherein the second width and the second length define a second surface plane having a plurality of second conductive island pads delimited by adjacent insulative material on the second plate electrode and wherein the first surface plane and the second surface plane face each other, and there being a spatial volume between the first surface plane and the second surface plane in which the fluid with the immersed particles is disposed; and a signal generator to provide a time-varying signal across the plurality of first conductive island pads and the plurality of second conductive island pads, wherein at any point in time a first voltage is provided to the first plurality of first conductive island pads and a second voltage is provided to the second plurality of second conductive island pads.

23. The apparatus for aggregating particles immersed in a fluid of claim 22 wherein the first plate electrode and the second plate electrode have outlines that are congruent in shape.

* * * * *